US006400729B1

(12) United States Patent
Shimadoi et al.

(10) Patent No.: US 6,400,729 B1
(45) Date of Patent: Jun. 4, 2002

(54) PROTOCOL CONVERSION SYSTEM FOR DATA COMMUNICATION BETWEEN DIFFERENT TYPES OF OPEN NETWORKS

(75) Inventors: Toru Shimadoi, Kawasaki; Satoshi Nishimura, Osaka; Taiichirou Sakaguchi, Osaka; Takashi Fukuda, Osaka; Yoshinobu Matsukawa, Osaka, all of (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/152,177

(22) Filed: Sep. 11, 1998

(30) Foreign Application Priority Data

Mar. 20, 1998 (JP) .............................. 10-072820

(51) Int. Cl.[7] .......................... H04L 29/06; G06F 13/00
(52) U.S. Cl. ....................... 370/466; 370/469
(58) Field of Search ............... 370/466, 467, 370/469

(56) References Cited

U.S. PATENT DOCUMENTS 5,778,189 A * 7/1998 Kimura et al. ............... 709/236
5,889,777 A * 3/1999 Miyao et al. ................. 370/466
6,075,796 A * 6/2000 Katseff et al. ............... 370/466

FOREIGN PATENT DOCUMENTS

| JP | 2223741 | 1/1990 |
| JP | 4227524 | 8/1992 |

* cited by examiner

Primary Examiner—Salvatore Cangialosi
(74) Attorney, Agent, or Firm—Katten Muchin Zanis Rosenman

(57) ABSTRACT

A protocol conversion system is provided to secure a highly reliable and smooth data communication between different two types of networks whose protocols differs in types from each other. A protocol conversion between such networks is realized by replacing headers added to communication data. Information indicating that sending data was success or failure in transmission is included in the headers, thereby sending results being recognized. A serial interface intervenes between the self and party systems in order to detect states of the party system. Further, for data communication, without processing (or terminating) layers up to an application layer, only lower layers, that is, a transport layer and layers lower than it, are processed (or terminated) to raise reliability in data communication.

14 Claims, 25 Drawing Sheets

PROTOCOL CONVERSION SYSTEM FOR DATA COMMUNICATION BETWEEN DIFFERENT TYPES OF OPEN NETWORKS

BACKGROUND OF THE INVENTION

The present invention relates to a protocol conversion system, and in particular, to the system which performs protocol-conversion for data communication between different types of open networks to which different types of protocols are implemented.

At present, under the growing demands for open systems and multi-venders, various types of connection mode of computers have been requested. Particularly, there are strong needs for connections, for example, from a network to another LAN (Local Area Network), or to a remote host computer network. For the connection from a closed network environment to another network environment, connecting devices such as routers are used. For connection with a higher processing performance, protocol conversion systems such as gateways are also used.

Routers perform connection between networks by processing up to the network layer of an OSI reference model to recognize what type of communication devices are connected in a network, and sending information necessary to the party system.

On one hand, gateways, which process all the layers of an OSI reference model, that is, up to an application layer, convert a protocol of data received from a communication network to another protocol of data which can be recognized by other computers.

However, since the foregoing routers cannot process by the transport layer and layers upper than the transport layer, there occurs a problem that the router, in itself, cannot solve cases where data have been lost on the way to a destination.

The gateways convert a protocol of data received from a communication network into another communication protocol and send them to its party protocol. Therefore if an abnormal situation occurs in the party system, it is no longer recognized by the gateways.

Furthermore, owing to the fact that the gateways are protocol conversion systems which process layers up to the application layer, designing the gateways takes a huge amount of work and a long time.

SUMMARY OF THE INVENTION

The present invention is provided to overcome the above drawbacks concerning the conventional protocol conversion systems. A first object of the present invention is to take appropriate measures against losses of data on the way in communication. A second object of the present invention is to properly recognize abnormal states which occurred in the party system. A third object of the present invention is to provide a protocol conversion system which raises reliability in the transmission and reception of data.

In the present invention, to achieve the first object concerning the router, the protocol conversion between different types of networks uses a method of replacing headers of communication data. By placing information about the success or failure in data transmission in the header, sending results of the communication data can be recognized.

In order to achieve the above second object relating to abnormalities occurred in gateway systems, the present invention provides a serial interface means intervening between two network systems. The serial interface means has a construction capable of reading the states of one party system.

Furthermore, to achieve the third object of the present invention, there is provided a construction which processes or terminates only both a transport layer and layers lower then the transport layer, instead of processing or terminating layers up to an application layer.

Specifically, there is provided a protocol conversion system intervening between different types of networks and being responsible for sending and receiving communication data therebetween, comprising: a first node performing communication of data based on a first protocol defining a communication system of a first network; a second node performing communication of data based on a second protocol defining a communication system of a second network, said second node including a protocol converting means for adding conversion information for conversion to the first protocol, adding control information for control of the first node, and terminating conversion information for conversion to the second protocol; and a protocol converter for mutually relaying the communication data between the first and second nodes and for controlling the first node, comprising: first communication data processing means for processing the communication data to the first node layer by layer; second communication data processing means for processing the communication data to the second node layer by layer; node control means not only having serial interface means but also having means for controlling the first node using the serial interface means, monitoring a state of the first node, and notifying the second node of a monitored state of the first node; and further protocol converting means for terminating the conversion information for conversion to the first protocol, converting to frames recognized by the first node based on the terminated conversion information, terminating the control information for control of the first node, and adding the conversion information for conversion of the communication data from the first node into the second protocol.

It is preferred that each of said first and second communication data processing means is constructed to terminate only lower layers of a protocol implemented in each processing means.

It is also preferred that said first protocol is an HDLC and said second protocol is a TCP/IP.

It is also preferred that said further protocol converting means includes means for replacing a header composed of a first identifier for identifying a type of the communication data, a second identifier indicating an origin from which the communication data are sent, a third identifier indicating a destination to which the communication data are sent, a fourth identifier indicating sequential information, and a fifth identifier indicating details of the first identifier. By way of example, said further protocol converting means includes means for classifying the communication data by identifying the header.

Further preferably, said node control means includes mean for monitoring the state of the first node through the serial interface means, and means for notifying the second node of the state of the first node when the monitoring means detects changes in the state of the first node. For example, said node control means further includes means for storing information about the monitored state of the first node, and said notifying means is constructed to notify the second node of the state of the first node in response to a request originated from the first node.

Preferably, said first node has means for receiving a physical address sent by the serial interface means and setting the physical address in the first protocol. In this case, said receiving and setting means may be constructed to be performed responsively to a request-to-start of operation sent from the second node.

It is also preferred that said protocol converter further comprises means for determining an abnormal state of a connection with the second node, means for cutting off the connection if the abnormal state is determined, means for performing a reconnection operation with the second node, and means for notifying the first node of the reconnection when the reconnection has been achieved.

PREFERRED EMBODIMENTS OF THE INVENTION

Referring to the accompanying drawings, a first embodiment of the present invention will be described.

Figure 1:
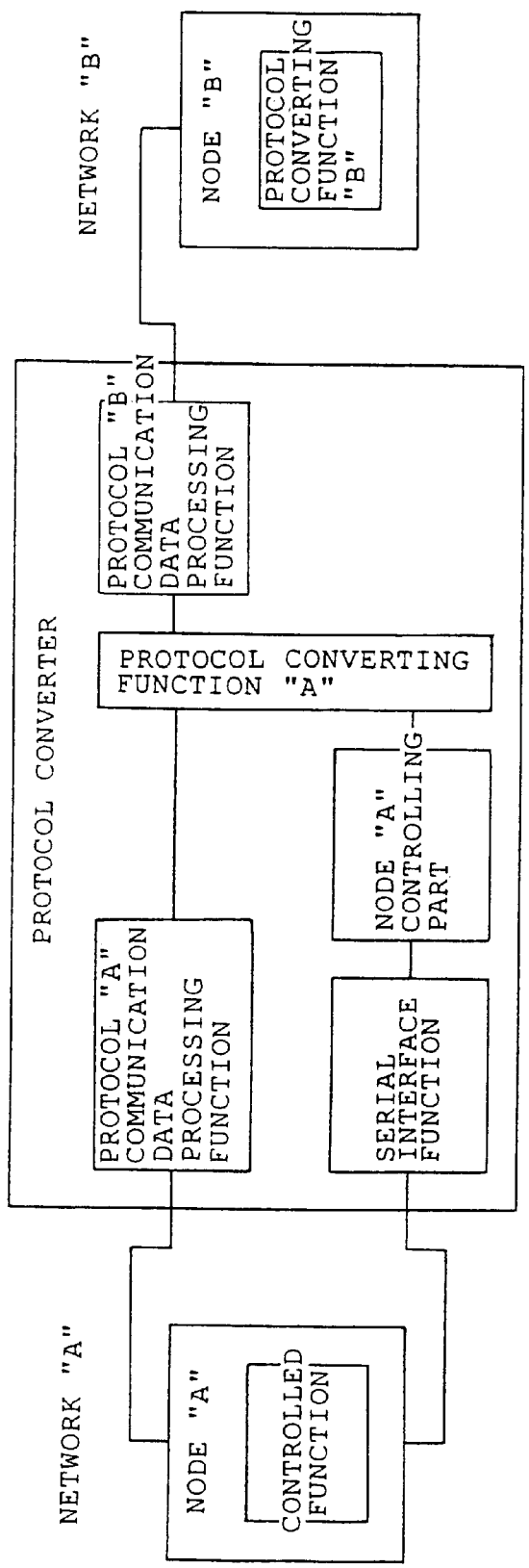
FIG. 1 shows the principle of a protocol conversion system according to the present invention.

As shown in FIG. 1, as to a network environment of the first embodiment, there are networks "A" and "B" in charge of data communication based on different protocols from each other. One network "A" uses a protocol "A" such as HDCL and the other network "B" a protocol "B" such as TCP/IP.

A node "A" is provided in the network "A". The node "A" performs communication based on the protocol "A" defining communication system in the network and includes a controlled means controlled by a serial interface means described later.

A node "B" is provided in the network "Be. The node "B" performs communication based on the protocol "B" defining communication system in the network "B" and has a protocol conversion means "B" which adds to data conversion information "A" for conversion to the protocol "A", adds to data control information "A" for controlling the node "A", or terminates conversion information "B" for conversion to the protocol "B".

Between the nodes "A" and "B", there is intervened a protocol converter that coverts protocols and has a control means for the node "A".

The protocol converter comprises a protocol "A" communication data processing means that processes communication data by the protocol "A" layer by layer for the layers of an OSI reference model, a protocol "B" communication data processing means that processes communication data by the protocol "B" layer by layer, a serial interface means and a node "A" controlling part both for controlling the node "A", and a protocol converting means "A" for converting protocols.

The OSI reference model is made up of seven layers of a physical layer, a data link layer, a network layer, a transport layer, a session layer, a presentation layer, and an application layer.

The protocol "A" communication data processing means and the protocol "B" communication data processing means are set to perform-processing corresponding to lower layers of the nodes "A" and "B".

The protocol converting means "A" terminates conversion information "A" for converting communication data supplied from the node "B" into the form of the protocol "A" and converts data to frames which can be recognized by the node "A" using the conversion information "A", or adds to data conversion information "B" for converting to the protocol "B" on the basis of frames from the node "A".

The protocol converting means "A" terminates node "A" control information (information primarily controlling the serial interface means) sent from the node "B", or adds information for notifying the protocol "B" of information about the node "A", which is collected from the node "A" controlling part, and sends it to the node "B".

The protocol converting means "B" terminates both of information for conversion to the protocol "A" and information associated with the node "A" controlling part.

Specifically, the protocol converting means "B" adds conversion information "B" for converting communication data sent from the node "A" in the form of protocol "B" and based on the information, converts data frames which are recognizable by the node "B", or has means terminating the conversion information "A" for converting data in the form of protocol "A", based the frames sent from the node "B".

Further, the protocol converting means "B" adds node "B" control information (information primarily controlling the serial interface means) sent from the node "A", or terminates information for notifying the protocol "A" of information about the node "A", which is collected from the node "B" controlling part, and sends it to the node "A". The protocol converting means "B" intervenes between the transport and session layers of the node "B".

Figure 2:
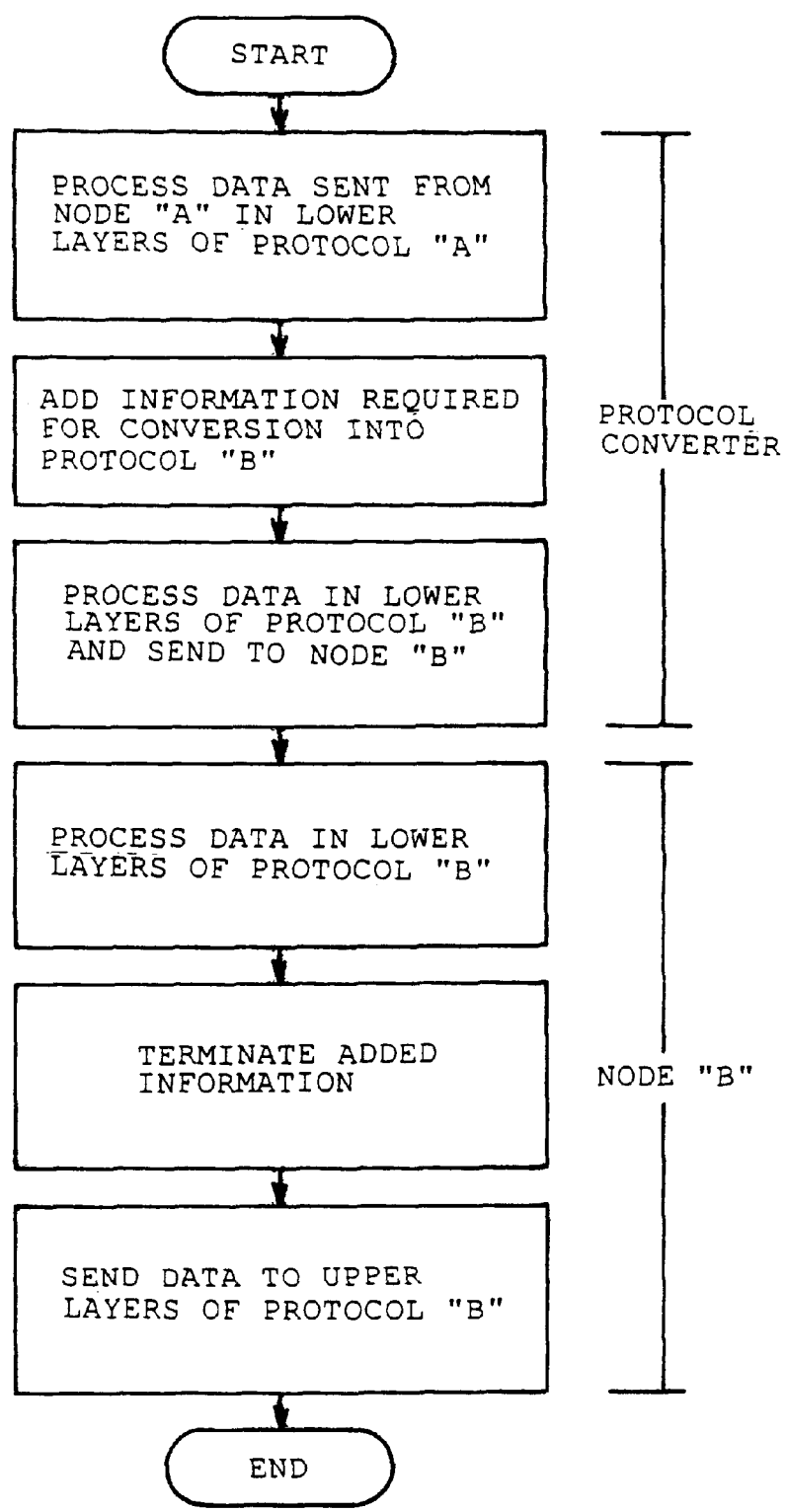
FIG. 2 is a flowchart showing procedures for protocol conversion from a node "A" to a node "B"

FIG. 2 shows a flowchart in protocol-converting from the node "A" to the node "B".

When converting protocols from the node "A" to the node "B", communication data sent from the node "A" are processed in the lower layers of the protocol "A", information for converting to the protocol "B" is added to data based on the frames, and communication data thus-information-added are processed in the lower layers of the protocol "B" to form new communication data, which are then sent to the node "B" where they are processed in the lower layers of the protocol "B". Then, added information is terminated, which is followed by sending communication data to the upper layers of the protocol "B".

In the above processing, adding (or terminating) information for converting communication data to frames which can be recognized by the party node is carried out by a header added (or terminated) to (or from) the communication data.

Figure 3:
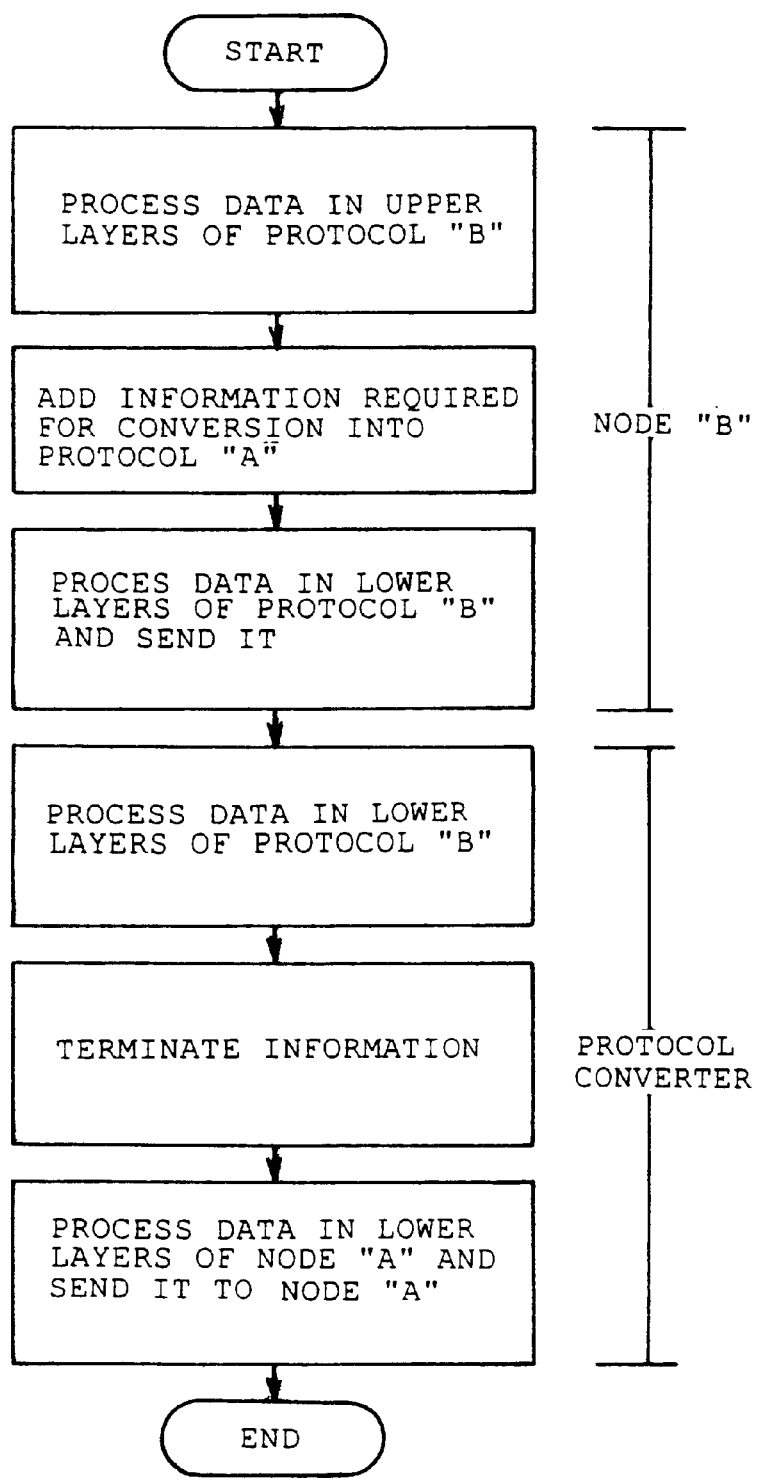
FIG. 3 is a flowchart showing procedures for protocol conversion from a node "B" to a node "A"

FIG. 3 shows a flowchart converting protocols from the node "B" to the node"A".

For protocol-converting the node "B" to the node "A", communication data are first processed in the upper layers of the protocol "B" in the node "B", and information for conversion to the protocol "A" are added to them. The information-added communication data are then processed in the lower layers of the protocol "B" of the node "B", and sent as communication data to the protocol converter. In the converter, communication data are processed in the lower layers of the protocol "B", the information for conversion to the protocol "A" is then terminated, and processed in the lower layers of the protocol "A", the processed communication data being sent to the node "A".

In the above processing, adding (or terminating) information for converting communication data to frames which can be recognized by the party node is carried out by a header added (or terminated) to (or from) the communication data.

Figure 4:
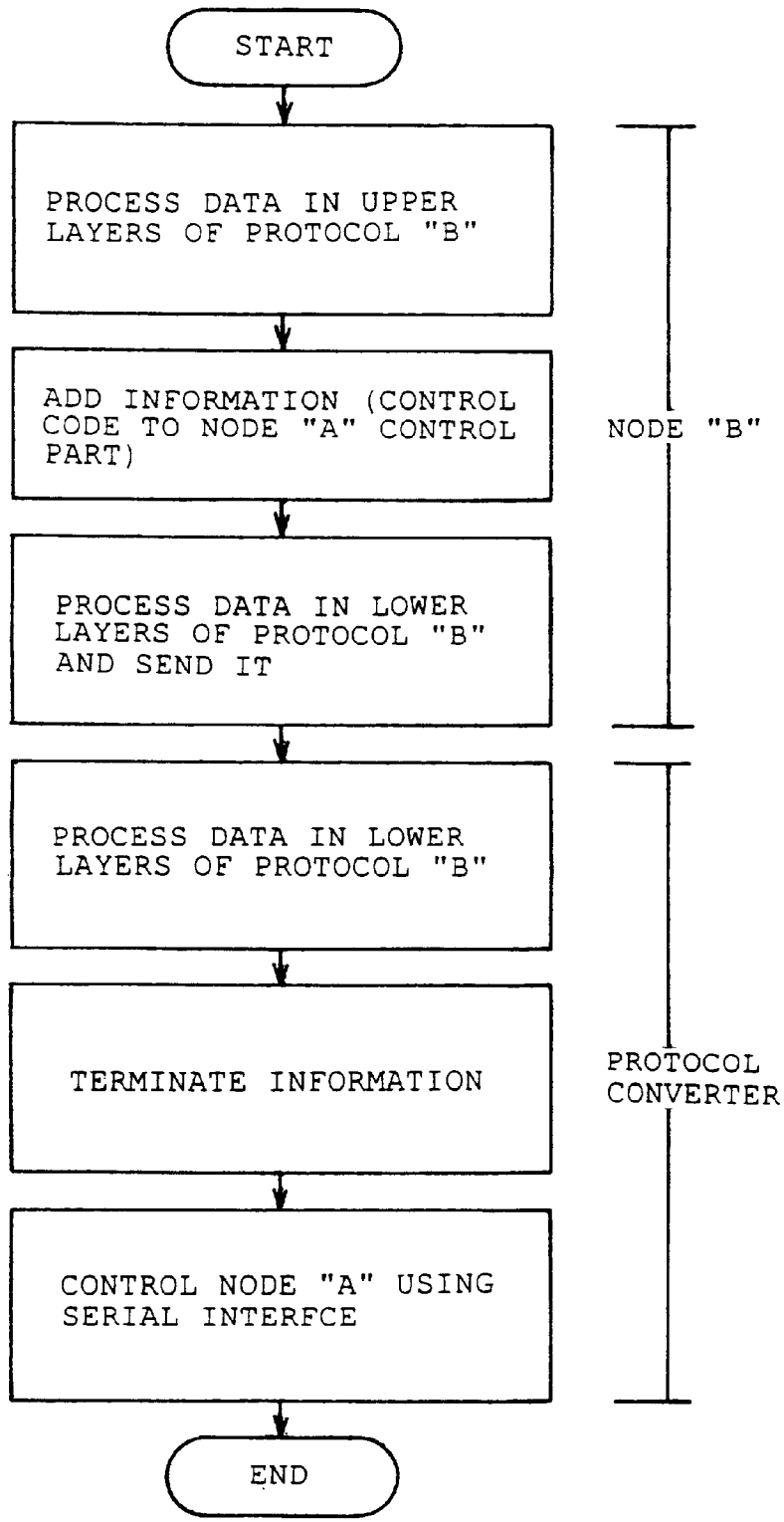
FIG. 4 is a flowchart showing control of the node "A" performed from the node "B"

FIG. 4 shows a flowchart controlling the node "A" from the node "B".

For controlling the node "A" from the node "B", processing carried out in the node "B" is that communication data are processed in the upper layers of the protocol "B", undergo addition of control code information to the node "A" control, processed in the lower layers of the protocol "B", and sent to the protocol converter as communication data. In the protocol converter, the communication data thus-received are processed in the lower layers of the protocol "B", and undergo the termination of the control code information. Then, based on the information, control is performed to the node "A" using the serial interface means. In addition, the control code is not restricted to control of the node "A" but applicable to a wide range of types of remote control.

In this control, adding (or terminating) information for control of the node "A" is done by adding (or terminating) a header to (or from) communication data.

Figure 5:
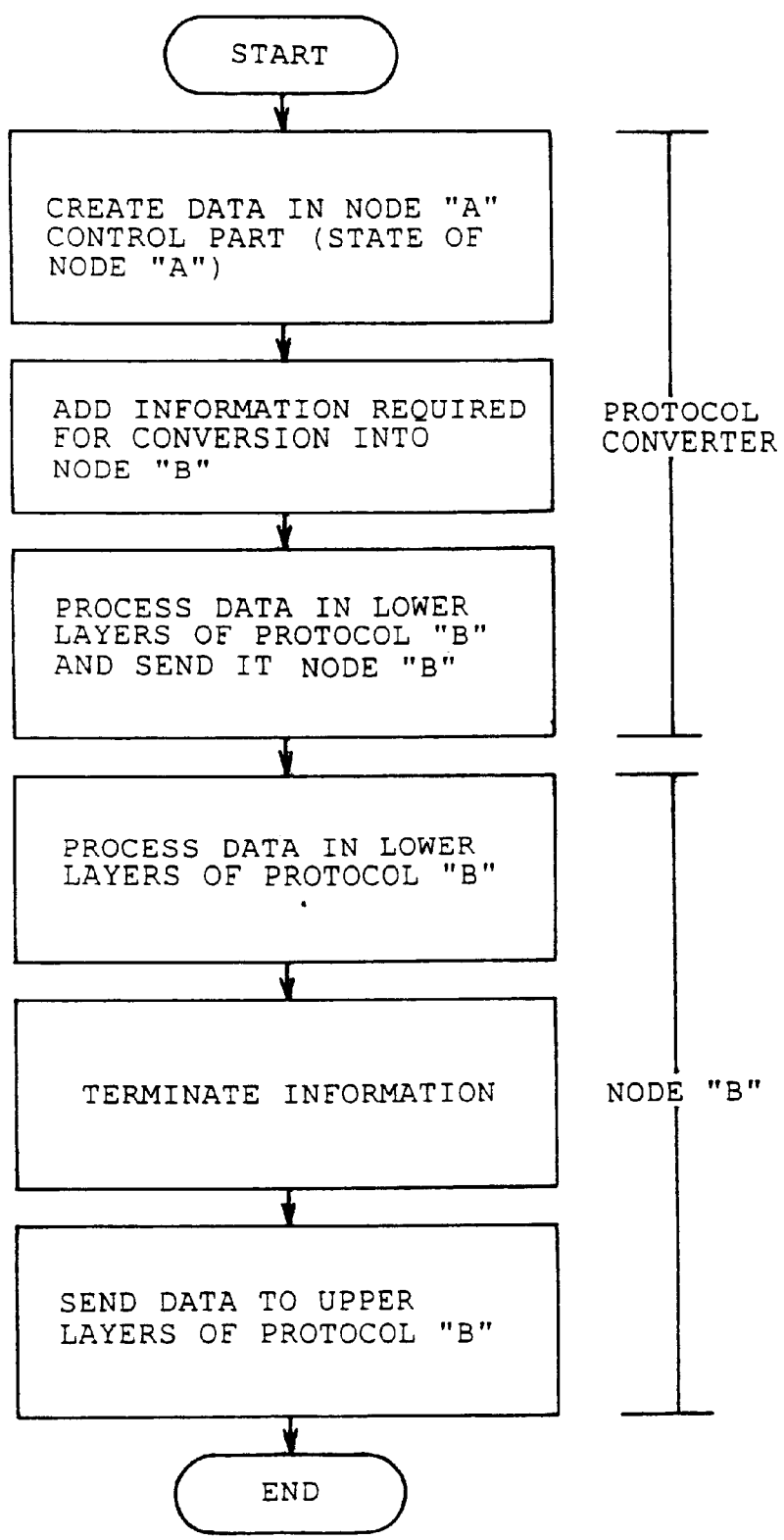
FIG. 5 is a flowchart in notifying the node "B" of the states of the node "A"

FIG. 5 represents a flowchart for notifying the node "B" of the state of the node "A".

For notifying the node "B" of the state of the node "A", the node "A" controlling part produces communication data indicative of the state of the node "A" using the serial interface. Based on the frames, information for conversion to the protocol "B" added to the communication data, which are then processed in the lower layers of the protocol "B" so as to produce communication data sent to the node "B". In the node "B", the communication data thus-obtained are processed in the lower layers of the protocol "B", subjected to the termination of the added information thereto, and sent to upper layers of the protocol "B".

In the above notification, adding (or terminating) information for notifying the state of the node "A" is also done by adding (or terminating) a header to (or from) communication data.

The operation of the embodiment will now explained.

In the present protocol conversion system, the design is such that the same protocol is implemented in the upper layers of both the nodes "A" and "B".

First, it is assumed that communication data are sent from the node "A". In response to this reception, by the protocol "A" communication data processing means, the communication data are processed in each layer thereof toward the transport layer from the physical layer, converted into a format of frames processed in the session layer, and handed to the protocol converting means "A". The layers in this mean correspond to the protocol "A".

The protocol converting means "A" protocol-converts this format of frames and passes them to the protocol "B" communication data processing means.

In this means, the format of frames, of which protocol has been converted by the protocol converting means "A", is processed in each layer, starting from the transport layer toward the physical layer. The layers in this mean correspond to the protocol "B".

In contrast, by the protocol converting means "A", communication data processed in the protocol "B" communication data processing means are protocol-converted, and handed to the protocol "A" communication data processing means.

The protocol "A" communication data processing means processes the communication data, which have underwent the protocol conversion, layer by layer, starting from the transport layer toward the physical layer. The layers in this mean correspond to the protocol "A". The communication data thus-processed are sent to the node "A".

Performing such operation enables the protocol conversion between different types of networks "A" and "B", thereby communication data being sent and received between them.

Operation for controlling the node "A" from the node "B" will now be explained.

First, communication data which have been processed in the upper layers of the node "B" are protocol-converted by the protocol converting means "B".

The converted communication data are then processed in the lower layers of the node "B", the processed results being sent to the protocol "B" communication data processing means. In this processing means, communication data are processed layer by layer, starting from the physical layer toward the transport layer, resultant data being handed to the protocol converting means "A". The layers in this converting means correspond to the protocol "B".

The protocol converting means "A" converts the protocol of the communication data processed in the protocol "B" communication data processing means, and hands its results to the node "A" controlling part.

The controlling part analyzes the protocol-converted communication data (i.e., control codes), and sends to the serial interface means information (control information) indicative of the analyzed results. And, the node "A" is controlled through the serial interface means, using the control information.

This operation permits the node "A" to be controlled from the node "B". Additionally, appropriately dividing and assigning the control codes makes it possible that the protocol converter, in itself, is controllable from the node "B".

Furthermore, operation in notifying the node "B" of the state of the node "A" will now be explained.

First of all, the node "A" controlling part acquires information about the state of the node "A" through the serial interface means. The node "A" controlling part sends the acquired information, as communication data, to the protocol converting means "A".

The protocol converting means "A" converts the protocol of the received communication data, and passes the converted results to the protocol "B" communication data processing means. In the processing means, the communication data of which protocol has been converted are processed layer by layer, starting from the transport layer toward the physical layer. This processing means has layers corresponding to the protocol "B".

In the node "B", the communication data, which have been sent from the protocol "B" communication data processing means, are converted into a format of frames which can be processed in the session layer, and protocol-converted by the protocol converting means "B". The communication data from the node "A" are then sent to the session layer.

The above operation enables the node "B" to recognize the state of the node "A".

A second embodiment of the present invention will now be described, which is practiced into a more concrete example.

Figure 6:
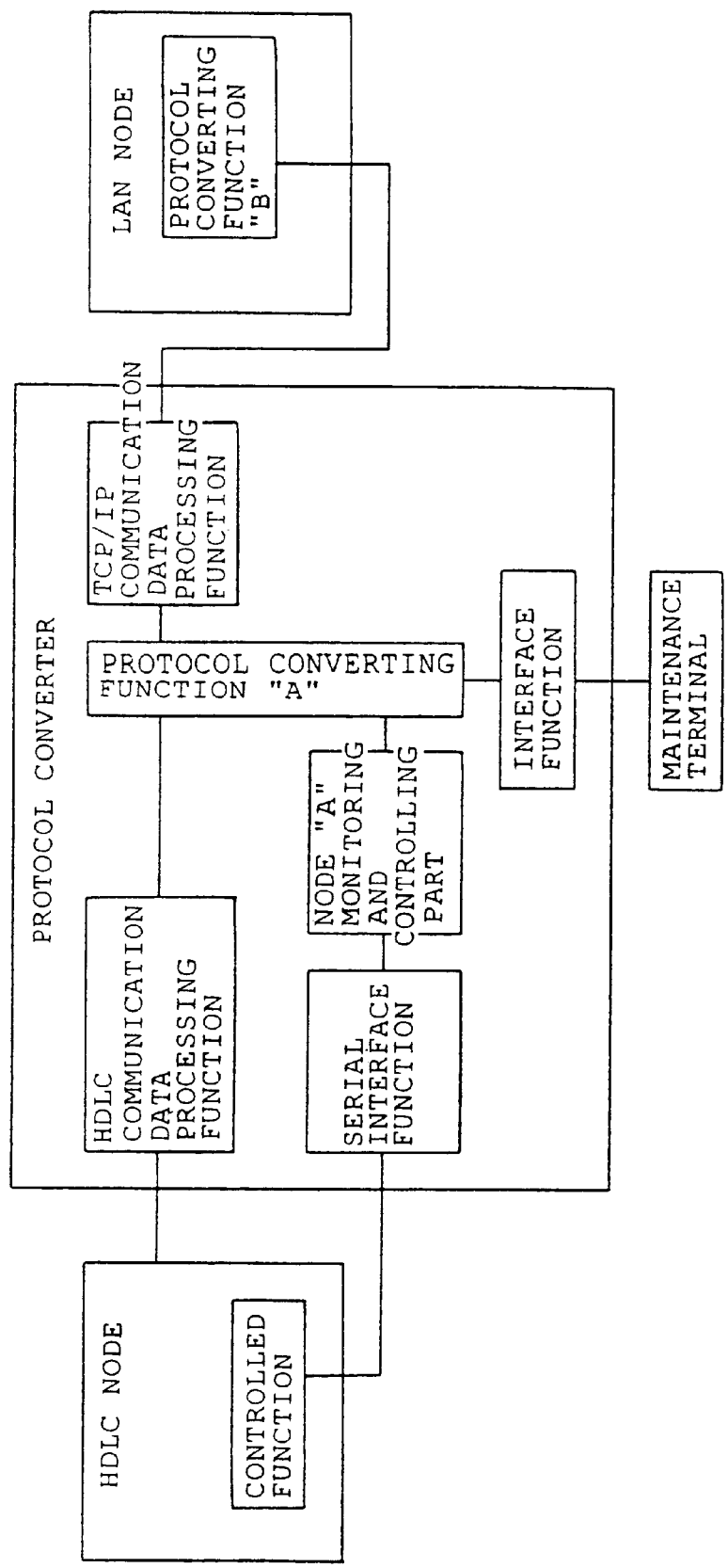
FIG. 6 is a schematic diagram of the protocol conversion system.

FIG. 6 is a schematic diagram showing a protocol conversion system. The system comprises a HDLC node that performs communication based on a HDLC (High level Data Link Control) protocol and has a controlled means that is controlled form a control converter later described, a LAN node that performs communication based on a TCP/IP (Transmission Control Protocol/Internet Protocol) and has a protocol converting means "B", a protocol converter that intervenes between the HDLC and LAN nodes for protocol conversion therebetween and has a serial interface means for controlling the HDLC node, and a maintenance terminal for maintaining and setting the protocol converter.

The protocol converter is provided with an HDLC communication data processing means for processing communication data layer by layer based on the HDLC protocol, a TCP/IP communication data processing means for processing communication data layer by layer based on the TCP/IP protocol, a protocol converting means "A" for converting the protocols of communication data, a serial interface means for controlling an HDLC node, a node "A" controlling part, and an interface means for controlling interface with the maintenance terminal.

Figure 7:
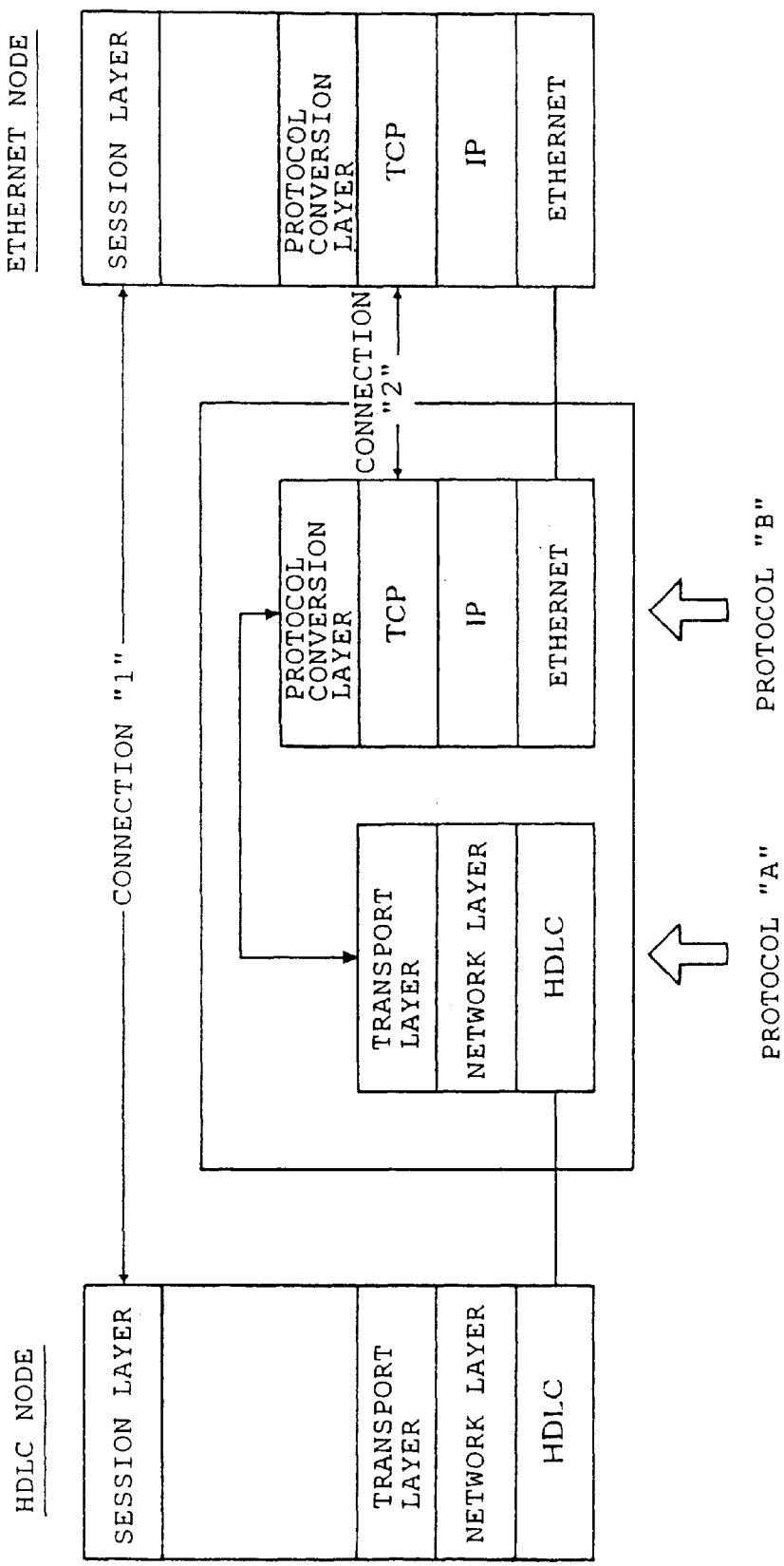
FIG. 7 represents a protocol construction employed in the protocol conversion system.

FIG. 7 shows a configuration of protocols in a system associated with the protocol converter.

This system is for converting protocols between two different types of networks and sending/receiving communication data. A" Ethernet is used as a protocol for the LAN node in the embodiment, thus explanation is given as an Ethernet node. The protocols implemented in the protocol converter consists of a protocol "A" for the HDLC communication data processing means and a protocol "B" for TCP/IP communication data processing means.

The protocol "A" is made up of an HDLC corresponding to physical and data link layers, a network layer and a transport layer. In contrast, the protocol "B" is made up of an Ethernet corresponding to physical and data link layers, an HDLC corresponding to a network layer, a TCP/IP corresponding to a transport layer, and a protocol converting layer for converting protocols.

A connection "1" is set between the session layers of the HDLC and Ethernet nodes. In addition, a connection "2" is set between the TCPs of the protocol "B" and Ethernet node.

Although being omitted in FIG. 7, information is classified by the protocol converting layer into information used for protocol conversion between the HDLC and Ethernet nodes and information terminated in the protocol converter. The former information is sent to the transport layer of the protocol "A", while the latter one is sent to the HDLC controlling part (node "A" controlling part) and terminated therein. A more detailed explanation is given later.

Figure 8:
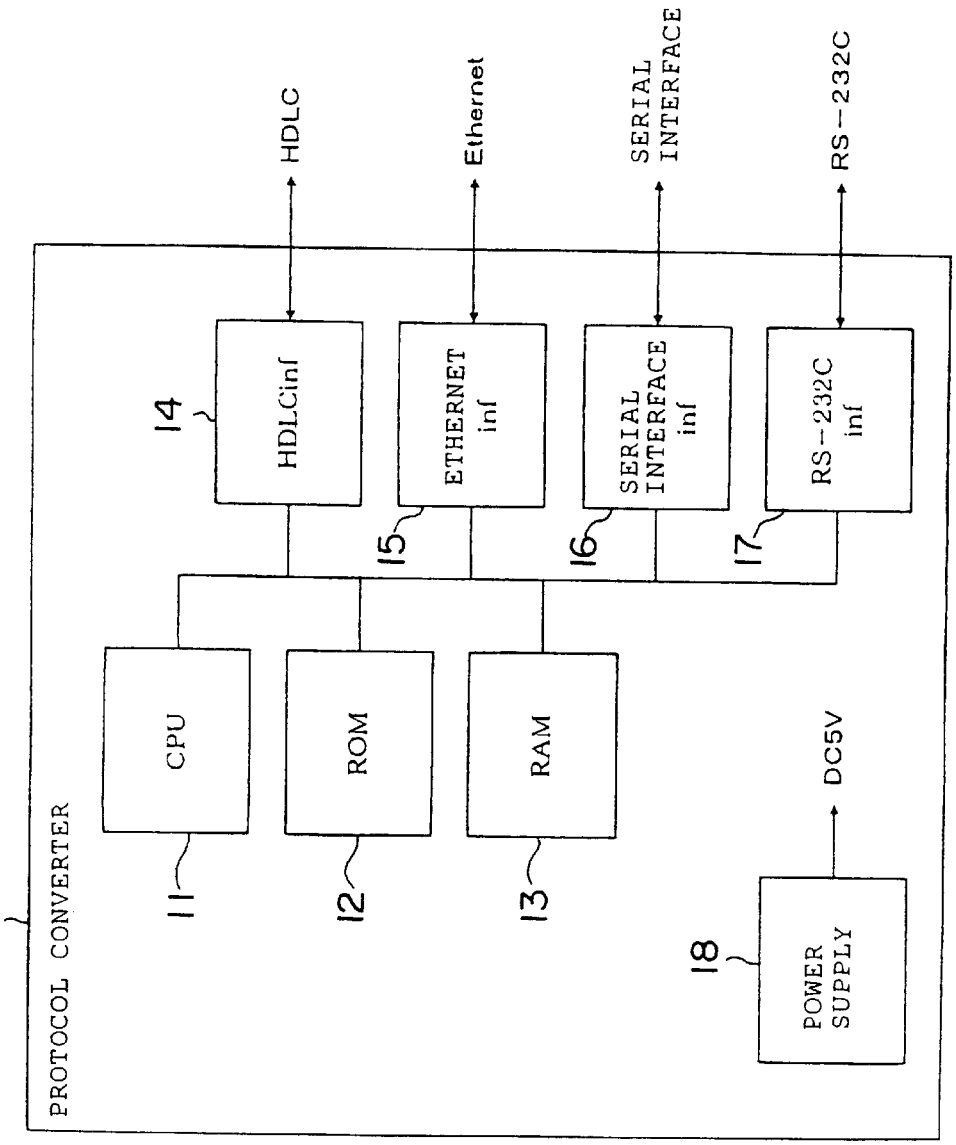
FIG. 8 shows a schematic hardware diagram of the protocol conversion system.

FIG. 8 shows a schematic configuration of hardware of the protocol converter 10.

In this configuration, a CPU 11 is responsible for control of the converter system. A ROM 12 includes EPROMs storing system control programs and serial EPROMs storing communication address/routing information and others. A RAM 13 is composed of DRAMs used for temporary data storage. An "HDLC inf" 14 is connected with the HDLC node in order to perform control of interface with the HDLC node.

An "Ethernet inf" 15 is connected with the Ethernet node for the purpose of interfacing with the Ethernet node. Additionally a "serial interface inf" 16 is connected with the serial interface (controlled means) of the HDLC node with the object of an interface with the serial interface.

An "RS-232C inf" 17 controls an interface with an RS-232C interface and is connected with the maintenance terminal. This protocol converter has a power supply 18.

Figure 9:
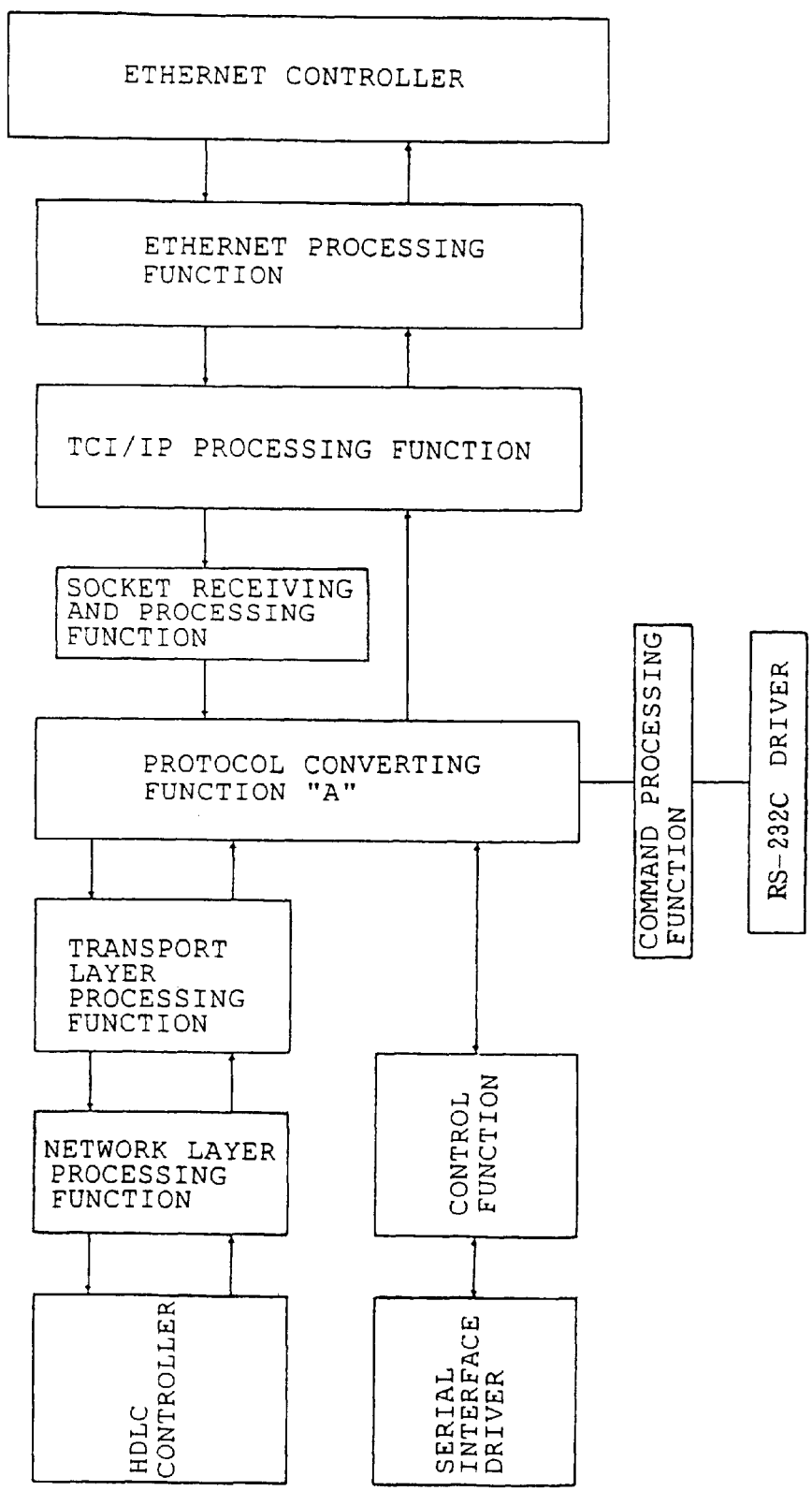
FIG. 9 shows a schematic firmware diagram of the protocol conversion system.

FIG. 9 represents a construction of firmware for the protocol converter.

The firmware is constructed such that it comprises an HDLC controller for processing the physical and data link layers positioning in the HDLC side, network layer processing means for processing in the network layer positioning in the HDLC side, transport layer processing means for processing in the transport layer positioning in the HDLC side, protocol converting means "A" for converting protocols, an Ethernet controller for processing the physical and data link layers positioning in the Ethernet side, Ethernet processing means which corresponds to the network layer positioning in the Ethernet side, TCP/IP processing means for communication processing in the TCP/IP positioning in Ethernet side, socket receiving and processing means for determining whether TCP/IP data have been received or not, a serial interface driver for communicating with the serial interface means (controlled means) of the HDLC node, control means for controlling the HDLC node using the serial interface means, an RS-232C driver having an interface for RS232C communication with the maintenance terminal, and command processing means for processing commands sent from the maintenance terminal.

Figure 10:
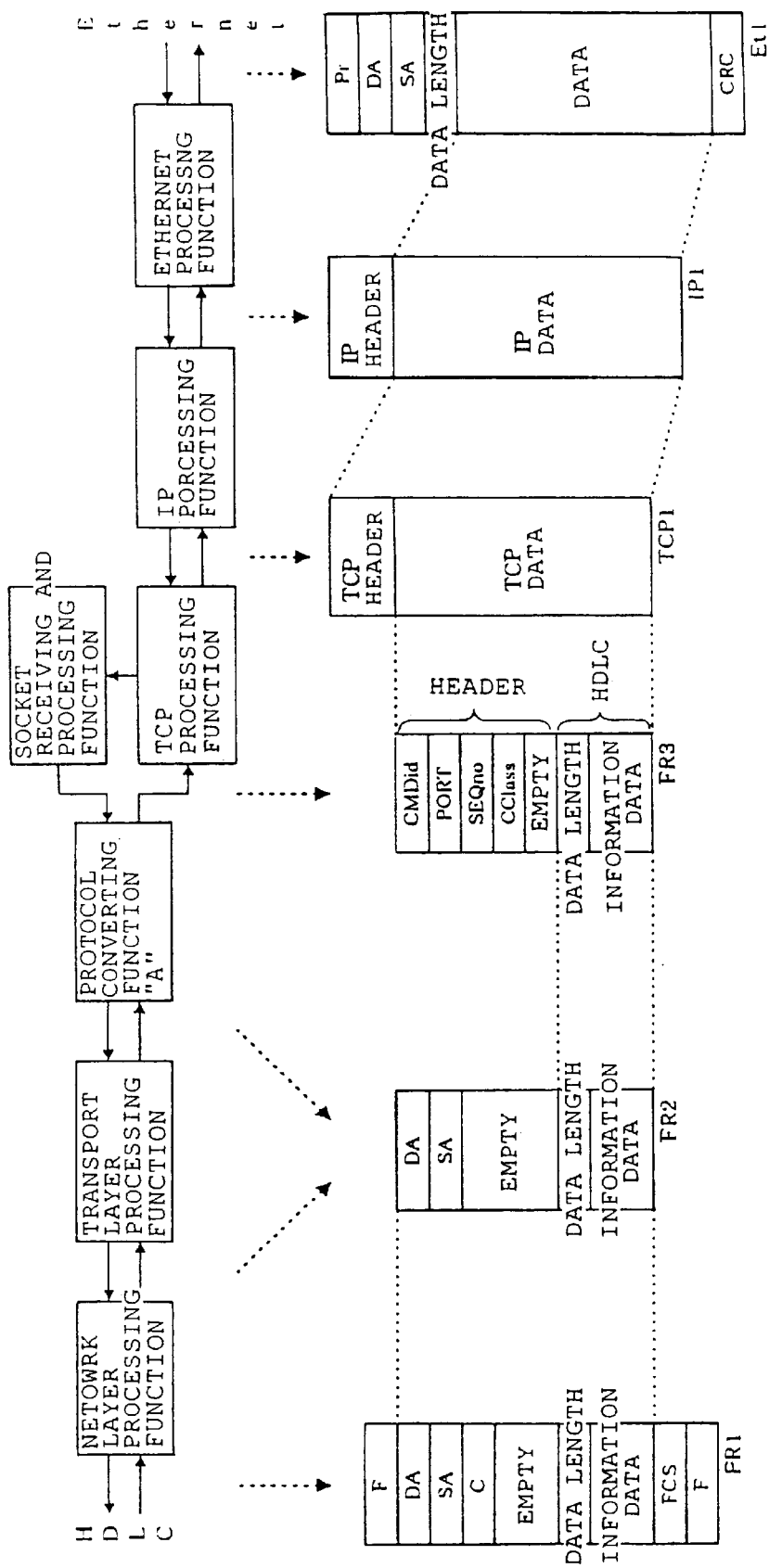
FIG. 10 pictorially shows frame conversions executed in a protocol converter.

FIG. 10 pictorially shows the states of a frame converted in the protocol converter, which corresponds to the protocol conversion between different types of two networks in sending and receiving communication data therebetween.

Assume that communication data are sent along an way directed from the HDLC to the Ethernet. A frame FR1 which has passed the HDLC controller is input into the network layer processing means. The frame FR1 is composed of a synchronous flag F, an object address field DA, a self address field SA, a control field C, a data length, information data, and FCS detecting errors.

In the network layer processing means, the frame FR1 synchronized with the synchronous flag F undergoes the error detection with the help of the FCS. The error detection, which conforms CCPIT, is performed by computing "$X^{16}+X^{12}+X^{5}+1$" and determining its resultant value is correct or not.

The control field C of the frame FR1 is then terminated, and its header field is expanded to be converted into an updated frame FR2. No frame conversion is carried out when the frame FR2 is sent from the transport layer processing means to the protocol converting means.

In the protocol converting means "A", the headers of the frame FR2 are replaced to produce an updated frame FR3. This replacement of the headers will be detailed later. By the TCP processing means, the frame FR3 is processed into TCP data, and a TCP header is added to the TCP data, thereby forming an updated frame TCP1.

Then, by the IP processing means, the frame TCP1 is processed into IP data, and an IP header is added to the IP data, producing an updated frame IP1. Then, by the Ethernet processing means, the frame IP1 is processed into DATA, and an Ethernet header consisting of preambles Pr, DA, SA and data length and a CRC detecting errors are added to the DATA, producing an updated frame IP1.

In cases where communication data are sent from the Ethernet to the HDLC, the opposite conversion procedures to the above are carried out in sequence.

Specifically, Data of a frame Et1 are converted into a frame IP1, IP data of the frame IP1 into a frame TCP1, and TCP data of the frame TCP1 into a frame FR3.

Further, CMDid of the frame FR3 is interpreted to see if it is information indicating a transmission direction from the Ethernet node to the HDLC node, and after this confirmation, it is terminated. Also, PORT of the frame FR3 is added to DA, and SEQno of the frame FR3 is retained, and a self address of the protocol converter is added to SA of the frame FR3.

Additionally, CClass of the frame FR3, which is a region used for controlling the HDLC node, is terminated (disregarded) in the case of protocol-converting communication data. A detailed explanation for this will be given later.

The frame FR2 is then converted to a frame FR1 handed as a HDLC frame. When being converted from the frame TCP1 to the frame FR3, after completing processing by the TCP processing means, the frame undergoes reference processing realized by the socket receiving and processing means which references if the TCP/IP data have been received or not. A frame conversion (a flow of frames) in controlling the HDLC node from the Ethernet node will be shown in FIG. 11.

A flow of frames is essentially is similar to the frame conversion for communication data from the Ethernet to the HDLC above shown in FIG. 10. Converted in sequence are Data of a frame Et1 to frame IP1, IP data of the frame IP1 to frame TCP1, TCP data of the frame TCP1 to a frame FR3.

CMDid of the frame FR3 is interpreted to see if it is control information sent from the Ethernet node, and after this confirmation, the CMDid is terminated. Then CClass is interpreted to obtain the details of control. PORT and SEQno are retained for response.

The control information sent from the Ethernet node is terminated at the stage of the frame FR3, no more frame conversion being taken place.

A method of classifying information (identification method) by the protocol converting function "A" will now be described.

As explained above, an identifier CMDid is used for classifying information in operating the protocol converting function "A". The CMDid is an identifier that identifies types of commands. The types include Dr(direction) indicating the directions of communication data sent or received, Nt(notification) indicating notifying data, Cl(control) indicating control data, Ts(test) indicating test data, Re(response) indicating response data, and Er(abnormal) indicating abnormal data.

The protocol converting function "A" classifies communication data by coding (CODE) the types of the identifier CMDid.

Figure 12:
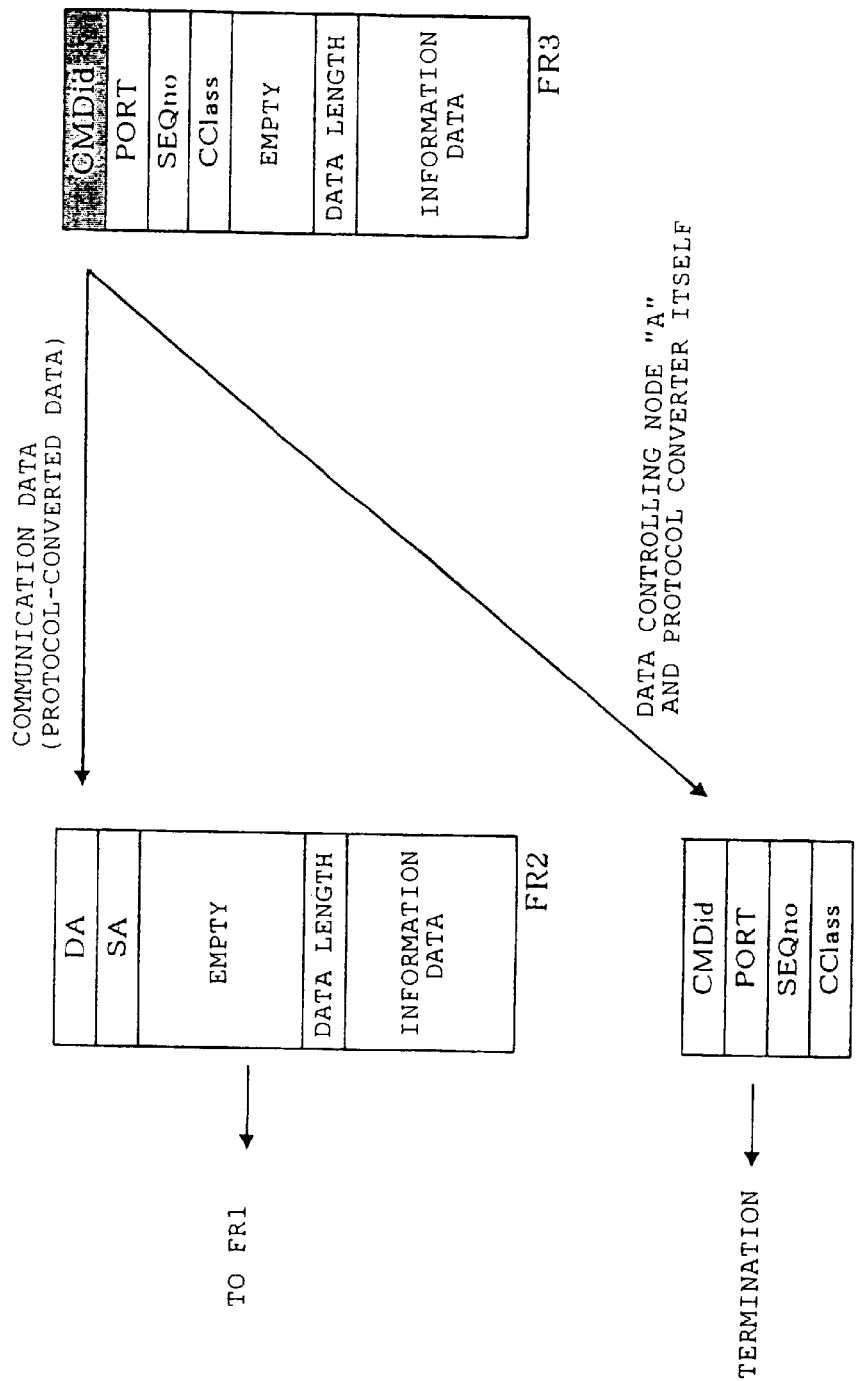
FIG. 12 represents the classification of communication data from the Ethernet node to the HDLC node.

FIG. 12 shows the classification in sending communication data from the Ethernet to the HDLC.

In the case that the CMDid of the frame FR3 indicates the communication data being sent from the Ethernet to the HDLC, the frame FR3 is converted into a frame FR2 and sent to the HDLC. But, if the CMDid indicates control information of the HDLC node (including the protocol converter), the conversion to the frame FR2 is no longer performed; the frame FR3 is terminated and control to the HDLC node is performed.

Information CClass of the frame FR3 is used as additional information when the CMDid indicates control information. In such a case that the CMDid indicates information other than control information, the CClass is handled as an empty area.

Figure 13:
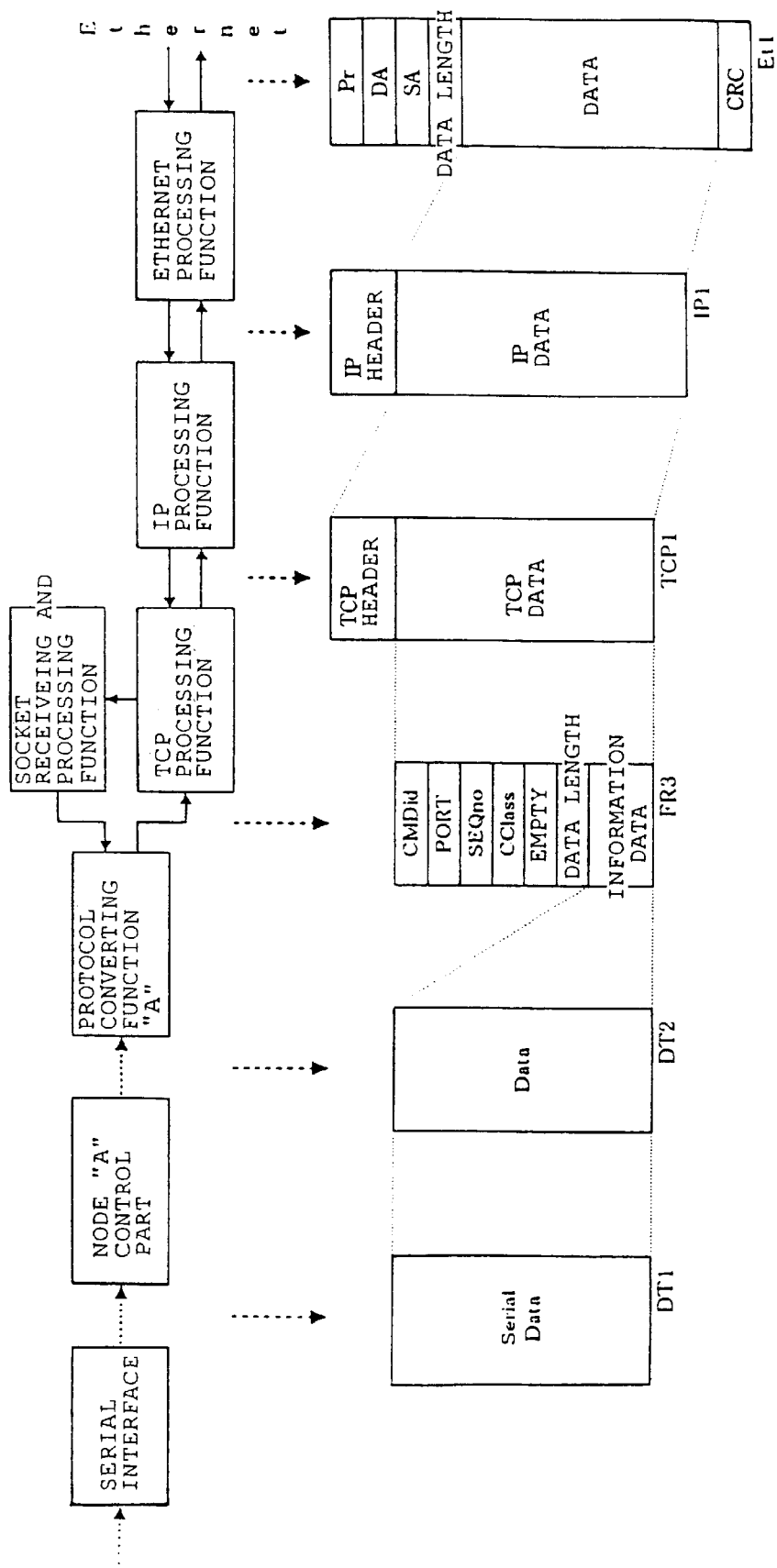
FIG. 13 represents frame conversions performed in the protocol converter when notifying the Ethernet node of the states of the HDLC node.

Next, a frame conversion (a flow of frames) in sending to the Ethernet node information (including information indicative of the states in the protocol converter) collected by the serial interface will now be explained in FIG. 13.

Data DT1 collected by the serial interface are input to the node "A" controlling part, wherein data DT1 are changed into a form of information data in agreement with a frame FR3 (data DT2), and then sent to the protocol converting function "AR.

In response to the reception, the protocol converting function "A" regards the data DT2 as information data, and therefore adds a header to produce a frame FR3. After this, like the case when communication data are sent from the HDLC to the Ethernet, the frame FR3 is in turn converted to a frame TCP1, to a frame IP1, and to a frame Et1 finally sent to the Ethernet node.

A frame conversion taken place by the protocol converting function "A" will be now explained.

Figure 14:
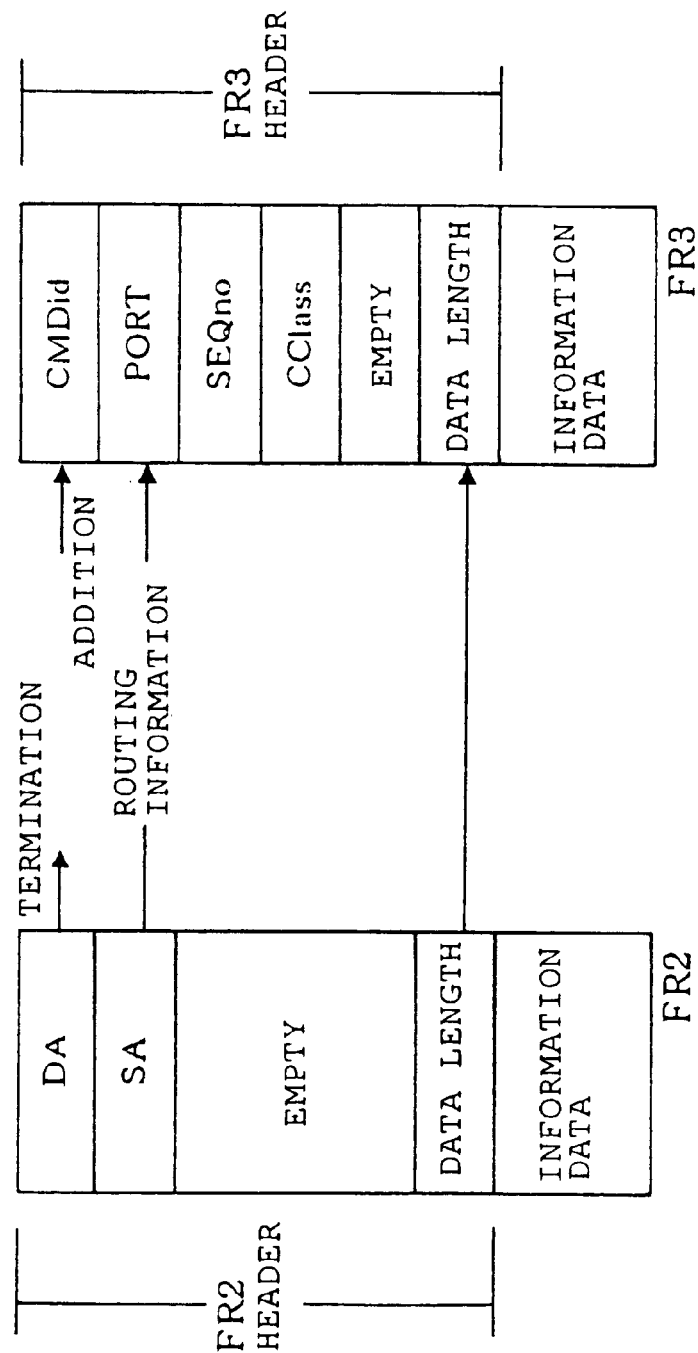
FIG. 14 pictorially shows the replacement of headers for conversion from the HDLC node to the Ethernet node.

FIG. 14 pictorially shows changing headers in protocol my- conversion of communication data sent from the HDLC to the Ethernet.

DA of the frame FR2 is terminated and the identifier CMDid is added to the frame FR3. Additionally, information about ports of the Ethernet node side, as routing information, is found out from the SA of the frame FR2, and converted to PORT.

Further SEQno (sequential number) is added which indicates sequential information making commands and responses managed in the protocol converter correspond with each other. (In this direction of flow of communication data, CClass is unused; therefore "Don't care" is added.) The foregoing procedures enable the headers to be changed from the FR2 header to the FR3 header.

Figure 15:
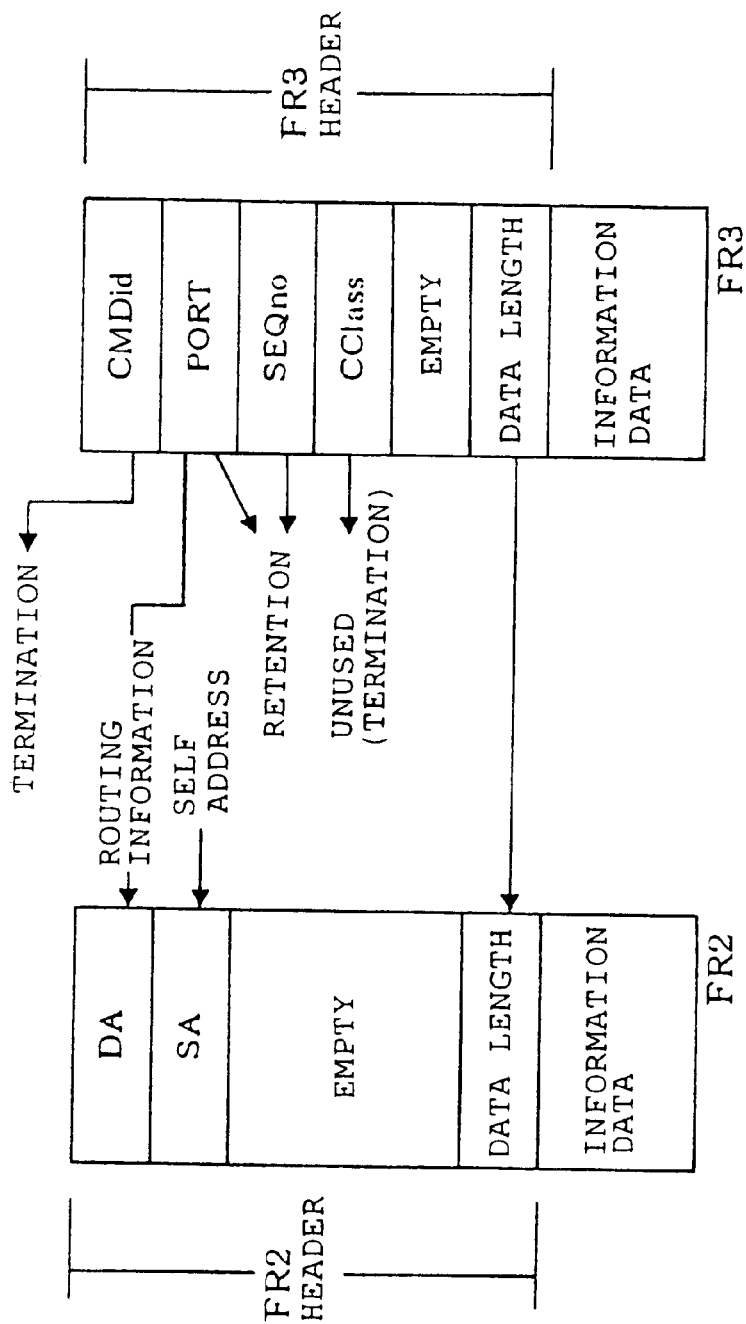
FIG. 15 pictorially shows the replacement of headers for conversion from the Ethernet node to the HDLC node.

FIG. 15 shows the change of headers for protocol-converting communication data sent from the Ethernet to the HDLC.

The CMDid of the frame FR3 is terminated, whereas object address information at the HDLC side is searched, as routing information, from PORT of the frame 3 and converted to DA.

PORT, SEQno, and CClass are retained to be used in transmission response to the Ethernet node. (In this communication direction, CClass is also unused, but retained in a form of "Don't care" for transmission response.) Further, the self address SA of the HDLC node side is added to the frame FR2.

The foregoing procedures enables the FR3 header to be replaced by the FR2 header.

Figure 16:
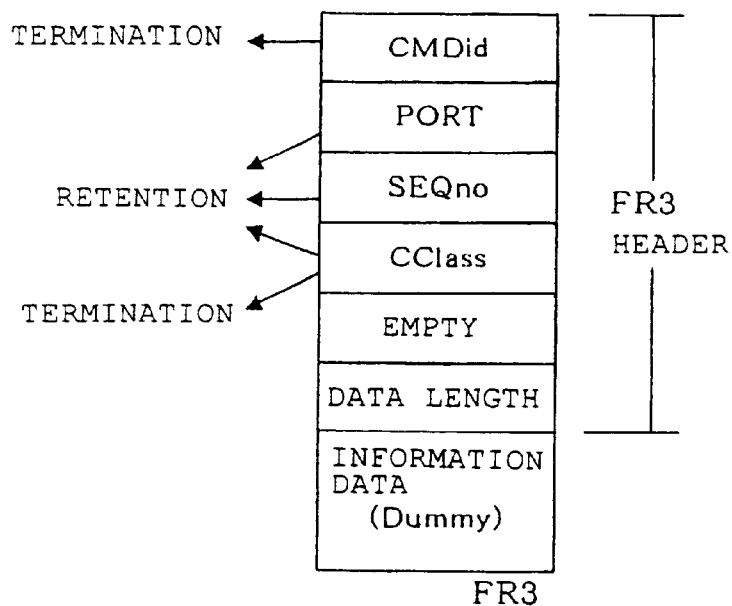
FIG. 16 depicts a header having control information operated from the Ethernet node.

FIG. 16 shows header operations of control information sent from the Ethernet.

Control information from the Ethernet does not undergo protocol conversion and replacement of headers, unlike the above-mentioned communication data protocol-converted. After the CMDid and CClass of the frame FR3 are interpreted to collect information, they are terminated. The interpreted results are sent, as control information, to the node "A" controlling part.

Concurrently, the PORT, SEQno, and CClass are retained for transmission response to the Ethernet node.

Such procedures makes it possible to operate the FR3 header.

Figure 17:
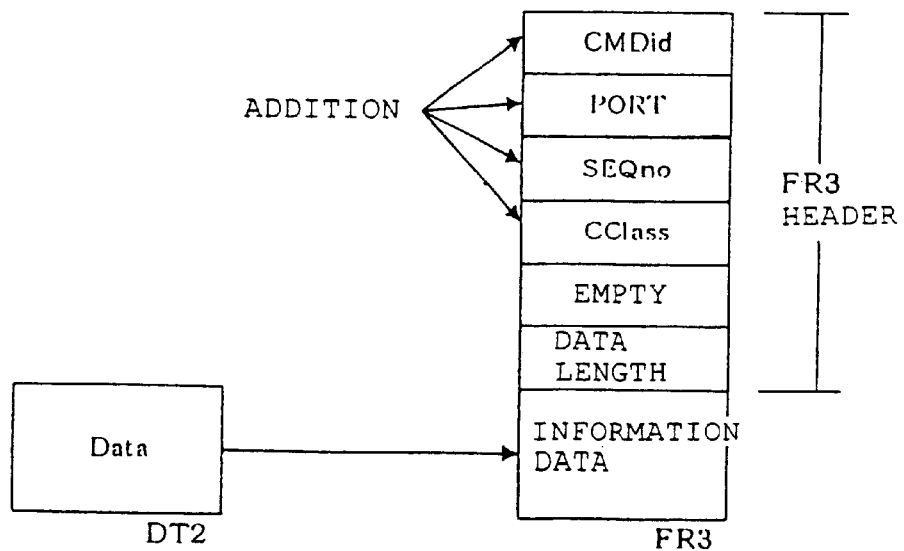
FIG. 17 depicts a header operated when sending to the Ethernet node information collected through the serial interface.

FIG. 17 shows header operations in sending to the Ethernet information collected by the serial interface (the information includes information about the protocol converter function).

Like FIG. 16, neither the conversion of protocols nor replacement of headers is taken place. Data DT2 collected by the serial interface are considered information data of a frame FR3, and CMDid, PORT, SEQno and CClass are added thereto. Such procedures allows the operations of the header of the frame FR3.

Figure 18:
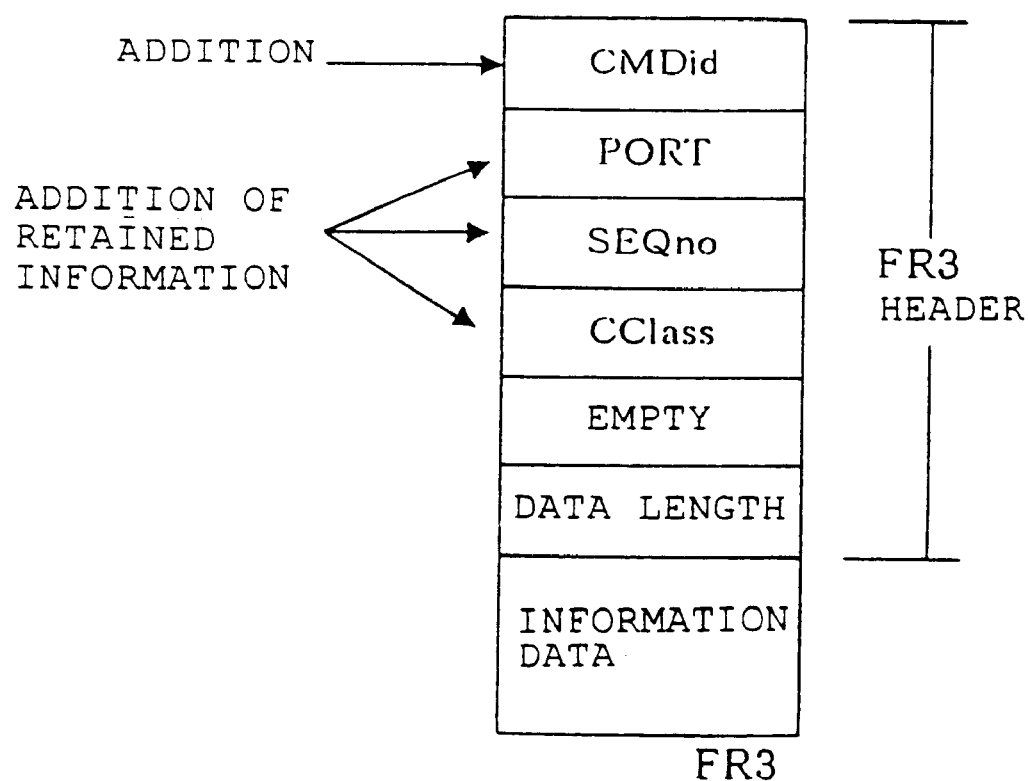
FIG. 18 shows a header performing transmission response for the Ethernet node.

FIG. 18 shows operations of a header for a transmission response to the Ethernet side.

The CMDid is added, and the PORT, SEQno and CClass which have been retained are added. The header thus-composed is used for the transmission response to the Ethernet side.

An operation sequence of the protocol converting system will now be descried in detail.

Figure 19:
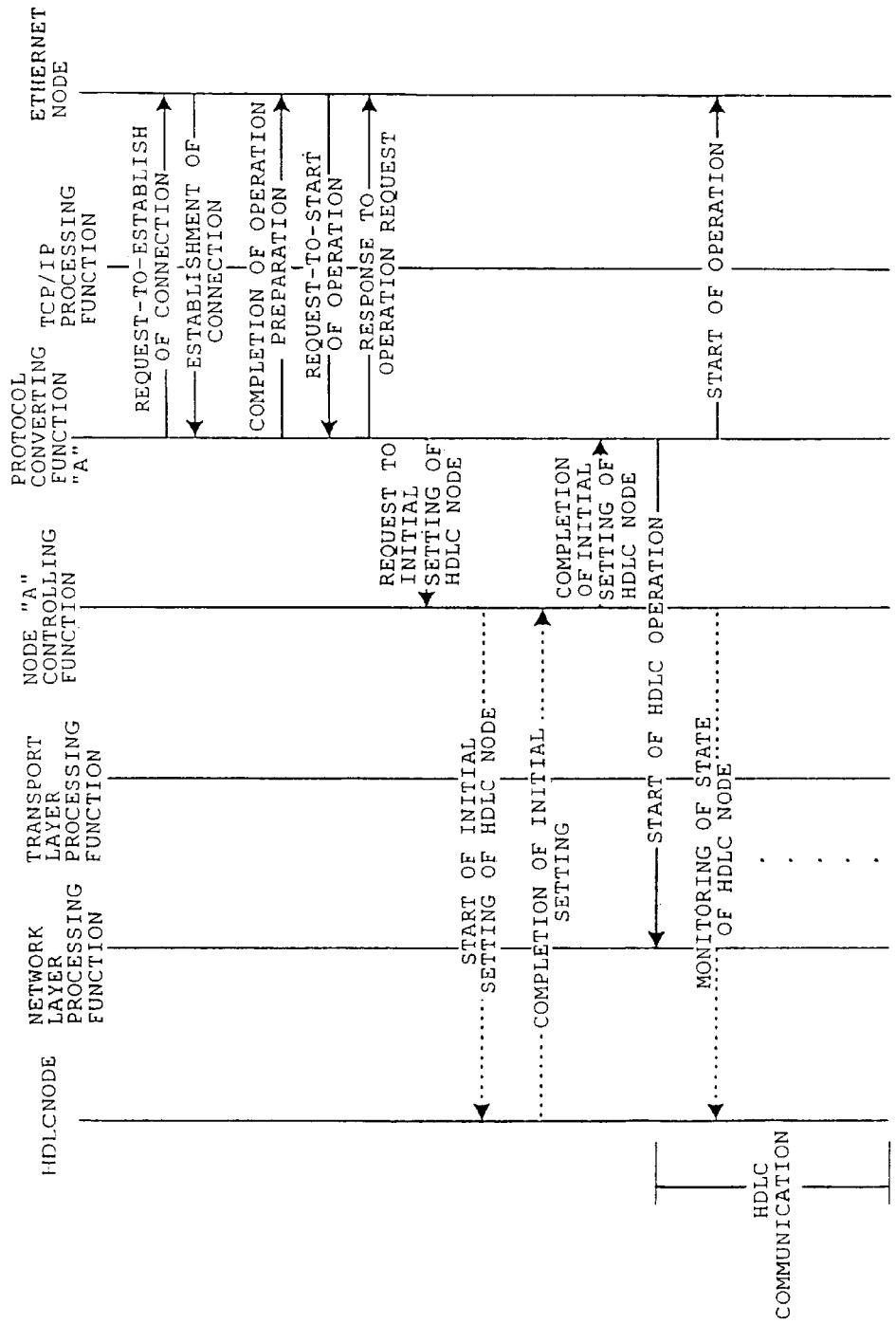
FIG. 19 is a sequence showing an initial operation.

FIG. 19 shows an initial operation sequence.

First of all, the protocol converting function "A" generates a request-to-establish of connection toward the Ethernet node through the TCP/IP processing means.

When receiving the request, the Ethernet node notifies the protocol converting function "A" of connection establishment through the TCP/IP processing function. The protocol converting function "A" confirms the establishment of connection, before it notifies the Ethernet node of the completion of operative preparation through the TCP/IP processing function.

The "completion of operative preparation" is used for notifying the upper layers of the Ethernet node that the protocol-converter has become ready for operation. In response to the notification, the upper layers of the Ethernet node therefore sends out a request-to-start for operation, instructing the protocol converter to start its operation.

Upon receiving the completion of operative preparation, the Ethernet node notifies a request-to-start operation to the protocol converting function "A" through the TCP/IP processing function.

In response to the request, the protocol converting function "A" notifies the Ethernet node of a response to the request-to-operate through the TCP/IP processing function, in order to notify that the request-to-start operation has surely been received.

The protocol converting means "A", when receiving the request-to-start operation, sends out a request for initially setting the HDLC node toward the node "A" control means. The node "A" control function, when receiving the setting request, initiates initial setting of the HDLC node through the serial interface function.

Accordingly, setting required for communication is done in the HDLC node. The HDLC node is designed such that it is prohibited from operation until the initial setting is completed.

After the initial setting, the HDLC node notifies the completion of the initial setting to the node "A" control function through the serial interface.

When receiving the notification about the completion of the initial setting, the node "A" control function notifies the protocol converting function "A" of the completion of the initial setting of the HDLC node. In response to this, the protocol converting function "A" notifies the network layer processing function of the start of an HDLC operation, making HDLC communication possible.

At a time when the HDLC operation starts, the operation start is notified to the Ethernet node through the TCP/IP processing function. This makes it possible to notify the Ethernet node that all the operation can work. The node "A" control function initiates, through the serial interface means, monitoring of states of the HDLC.

The protocol converter thus-explained does not perform such operations as protocol conversion and initial setting of the HDLC node, unless receiving instructions from the upper layers of the Ethernet node. Assigning part of the operations of the protocol converter to the upper layers of the Ethernet node permits the integrated management of the system. This is also effective in software design.

Additionally, regularly reading the states of the HDLC node and managing the read information make system management easier.

Figure 20:
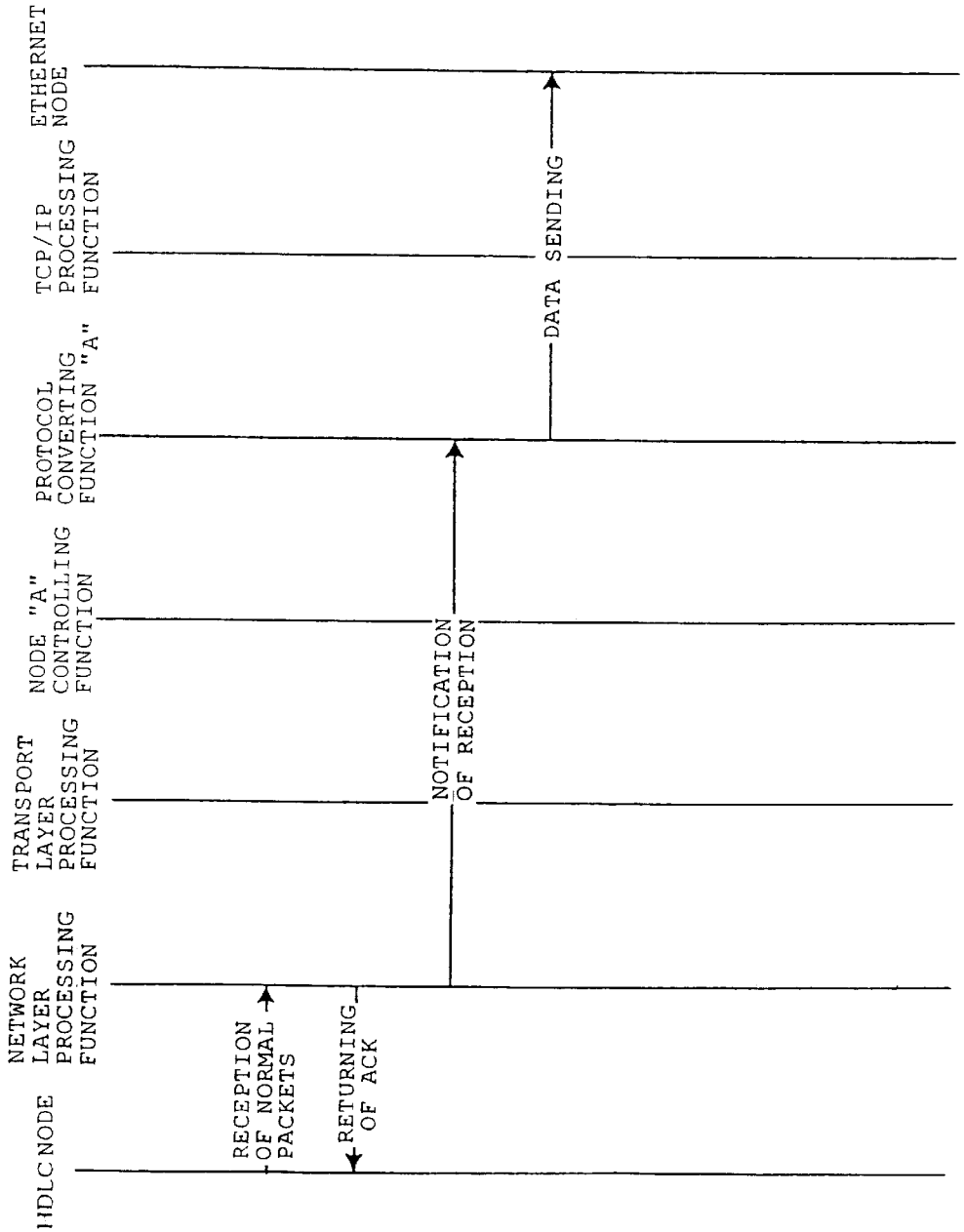
FIG. 20 is a sending and receiving sequence in a normal state when being communicated from the HDLC node to the Ethernet node.

FIG. 20 is a transmission and reception sequence in the case that data transmission from the HDLC node to the Ethernet node ends in a "normal state".

Normal packets are received by the network layer processing function. After this reception, an ACK is returned to the HDLC node. After returning the ACK, the reception of the normal packets are notified to the protocol converting function "A", through the transport layer processing function. Trough the TCP/IP processing function, the protocol converting function "A" sends out data toward'the Ethernet node.

As described above, for data transmission from the HDLC node to the Ethernet node, returning the ACK immediately after the notification of the reception was performed by the network layer processing function prevents occurrences of time-out in a period during which the HDLC node waits the ACK. In consequence, even if a protocol has a very short time-out concerning the ACK waiting, a protocol conversion is available.

Figure 21:
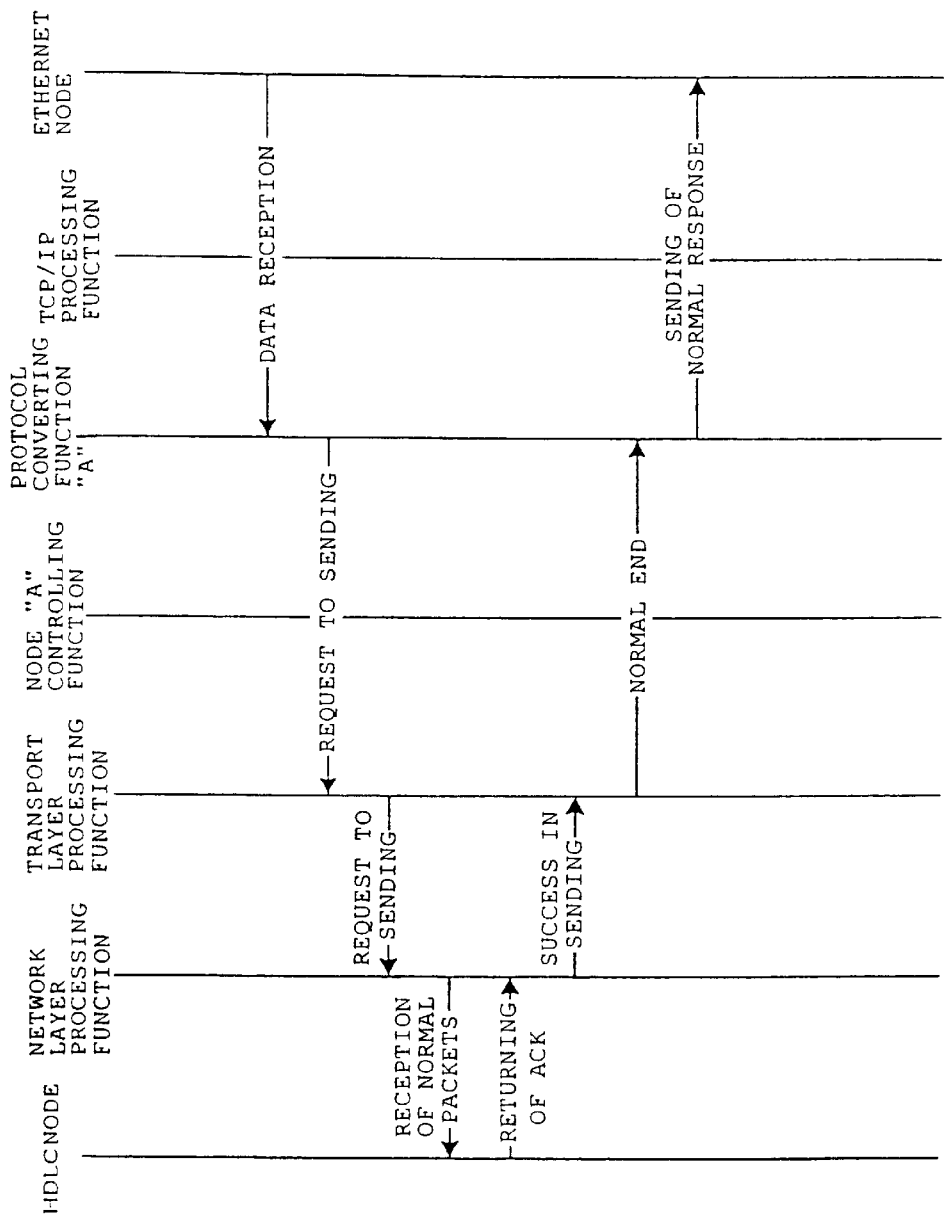
FIG. 21 is a sending and receiving sequence in a normal state when being communicated from the Ethernet node to the HDLC node.

FIG. 21 shows a transmission and reception sequence in the case that data transmission from the Ethernet node to the HDLC node ends in a "normal state".

The protocol converting function "A" receives, through the TCP/IP processing function, data from the Ethernet node. Then the protocol converting function "A" sends a request-to-send toward the transport layer processing function. The processing function responsively relays the request-to-send to the network layer processing function. The HDLC node sends normal packets in response to the request sent from the network layer processing function.

The HDLC node returns an ACK to the network layer processing function, which then notifies the transport layer processing function that the transmission was successful.

The transport layer processing function then notifies a normal end of the protocol converting function. The protocol converting function "A" notifies, through the TCP/IP processing function, the Ethernet node of a normal response transmission.

As described above, for data transmission from the Ethernet node to the HDLC node, after having received the ACK from the HDLC node, a notification that the sending was successful is sent to the Ethernet node. This approach increases reliability in transmission and reception of data.

Figure 22:
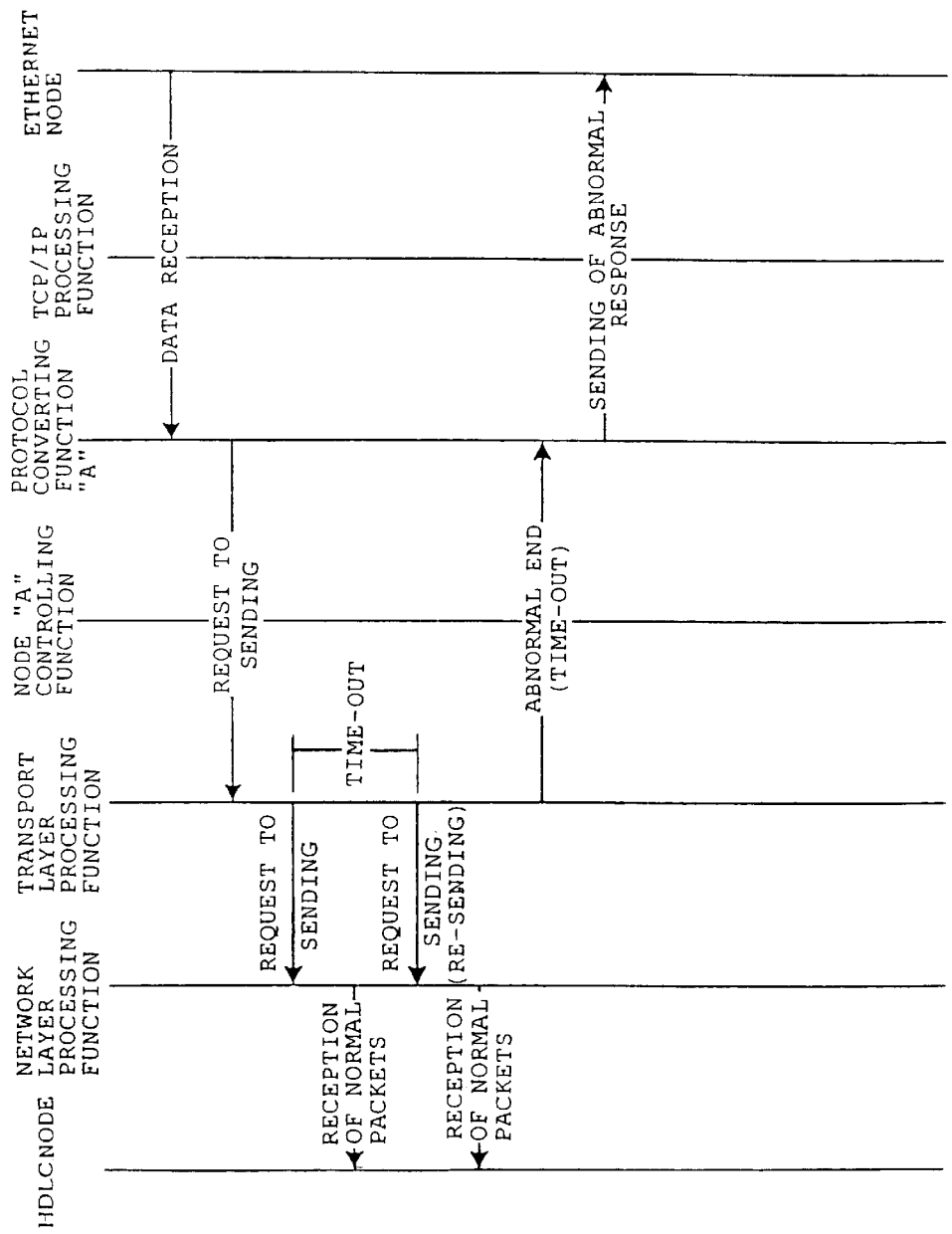
FIG. 22 is a sending and receiving sequence in an abnormal state when being communicated from the Ethernet node to the HDLC node.

FIG. 22 is a transmission and reception sequence in the case that data transmission from the Ethernet node to the HDLC node ends in a "abnormal state".

The protocol converting function "A" receives data from the Ethernet node, through the TCP/IP processing function. The protocol converting function "A" then send out a request-to-send toward the transport layer processing function.

The processing function also sends out the request-to-send toward the network layer processing function, which then sends normal packets to the HDLC node. However, assume that the time-out occurs, with no return of the ACK from the HDLC node.

The transport layer processing function sends out again a request-to-send to the network layer processing function, which again tries to send normal packets to the HDLC node.

But, it is occasionally assumed that no ACK is returned, and time-out again occurs. The transport layer processing function notifies the protocol converting function "A" of an abnormal end (i.e., time-out). The protocol converting function "A" notifies, through the TCP/IP processing function, the Ethernet node of an abnormal response transmission.

Therefore, in cases no ACK is returned owing to abnormalities caused by the time-out, a response notifying an abnormality is sent from the protocol converting function "A" to the Ethernet node. This sending permits the Ethernet node to recognize the abnormality in the HDLC node. Furthermore, in the case of abnormalities other than the time-out, the same sequence is employed, thus making it possible to mutually recognize abnormalities in both the HDLC node and the Ethernet node.

Figure 23:
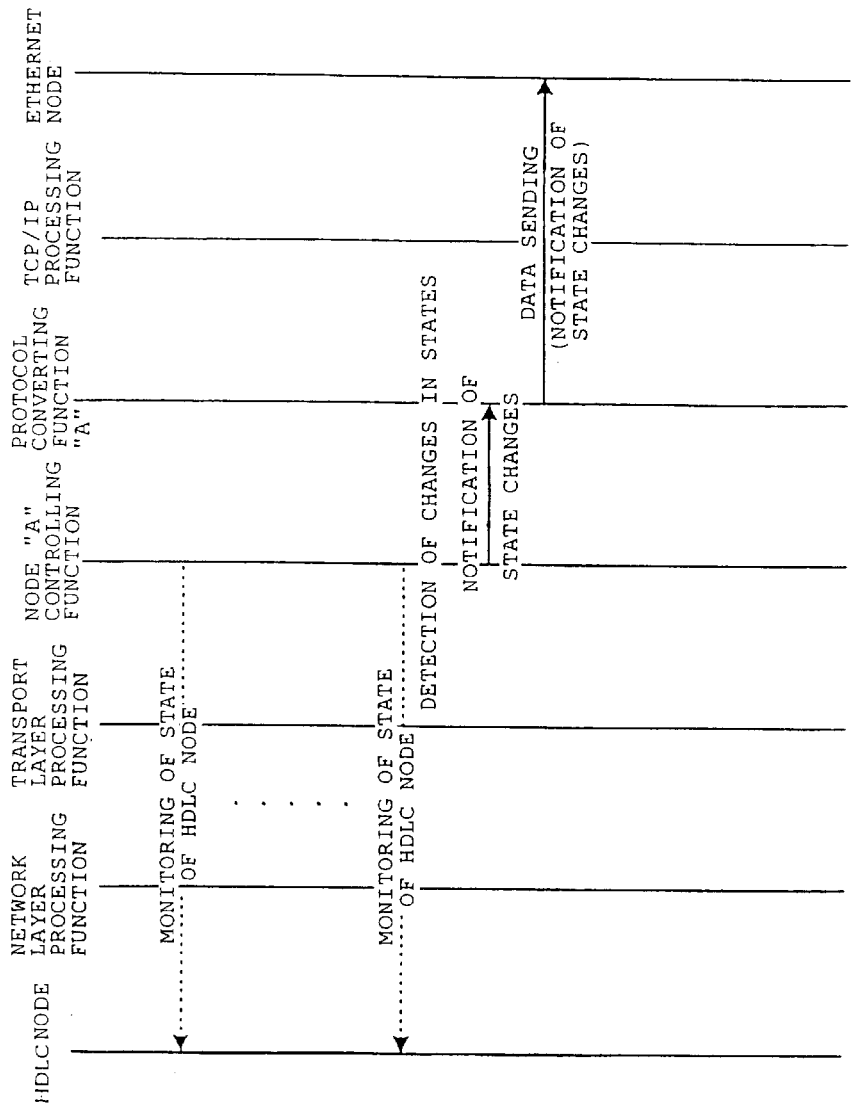
FIG. 23 is a sequence in sending for the Ethernet node a notification representing changes in the HDLC node detected by the serial interface.

FIG. 23 is a sequence notifying the Ethernet node of abnormalities (changes in states) in the HDLC node, which are collected by the serial interface.

The node "A" control function collects the states of the HDLC node through the serial interface function. When detecting changes in states of the HDLC node (for example, a transition from a normal state to an abnormal state), the node "A" control function notifies such change in states to the protocol converting function "A".

In response to the notification, the protocol converting function "A" sends data to the Ethernet node (notification of changes in states) through the TCP/IP processing function.

As stated above, the protocol converter monitors the states of the HDLC node, during which time it will have the protocol converting function send communication data to the Ethernet node when changes in the states were found. This permits the Ethernet node to recognize the changes in states of the HDLC node.

Figure 24:
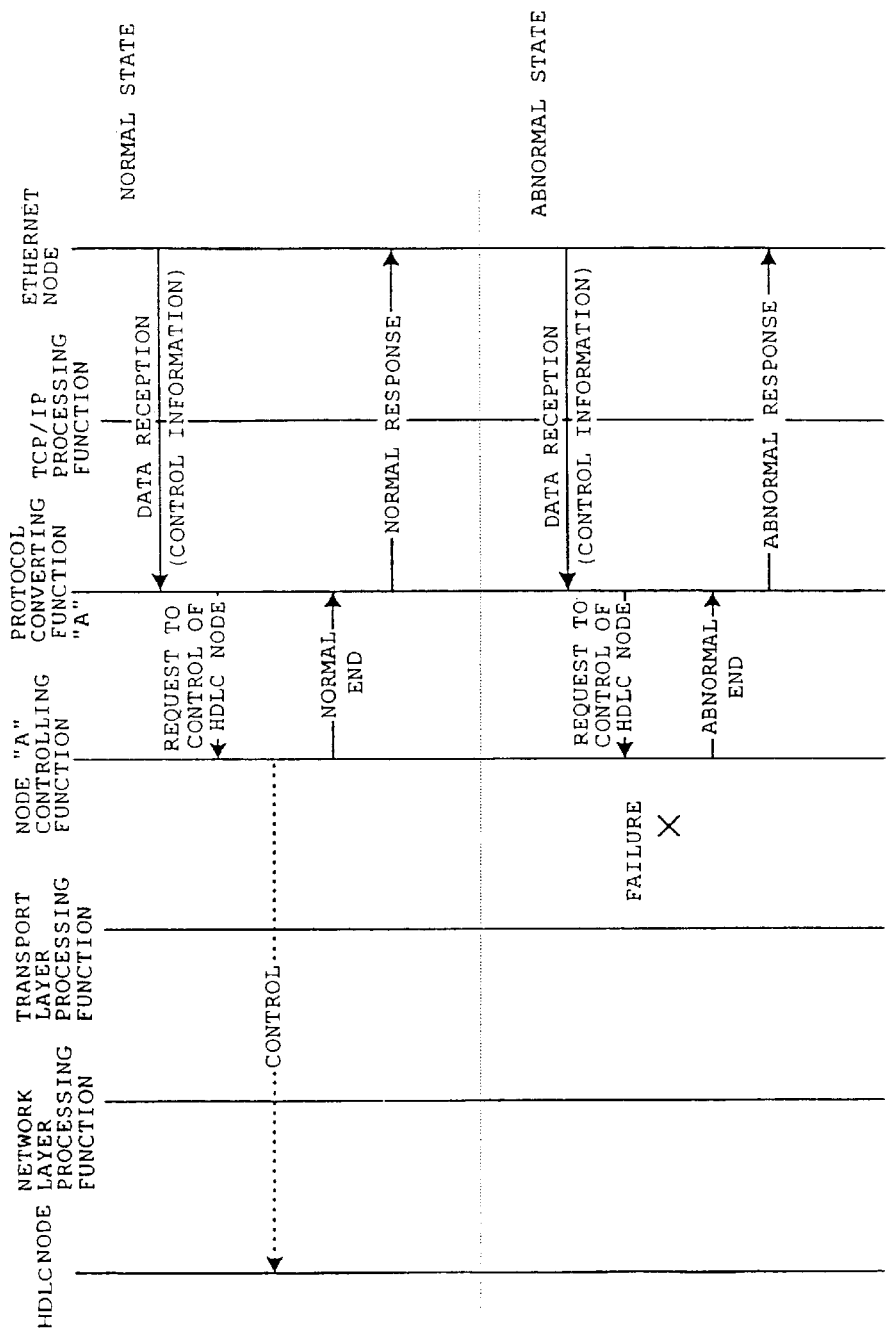
FIG. 24 is a sequence in controlling the HDLC node and the protocol converter from the Ethernet node.

FIG. 24 is a transmission and reception sequence in controlling the HDLC node and the protocol converter from the Ethernet node.

Through the TCP/IP processing means, the protocol converting means "A" receives data (control information) from the Ethernet node. Then the protocol converting means A sends out a request-to-control for the HDLC node toward the node "A" control means.

Responsively to this instruction, the node "A" control function controls the HDLC node via the serial interface. In some cases, the node "A" control function controls itself (i.e., the operations of the protocol converter are controlled) via the serial interface.

Responsively to an instruction from the protocol converting function "A", the node "A" control function controls the HDLC node via the serial interface. When receiving a notification that the operation ended in the normal state, the protocol converting function "A" notifies the Ethernet node of the normal end through the TCP/IP processing means.

The above procedures are for the normal ending of control, while a sequence described below are in the case of an abnormal ending. The protocol converting function "A" receives, through the TCP/IP processing function, data (control information) from the Ethernet node.

And a request-to-control for the HDLC node is given to the node "A" control function by the protocol converting function "A". Assume that the node "A" control function is out of order due to some reasons or the serial interface function is in an abnormal state.

In such a case, the node "A" control function sends to the protocol converting function "A" an instruction to end in an abnormal state. In response to this- instruction, the protocol converting function "A" sends to the Ethernet node the abnormal response with the help of the TCP/IP processing function.

In this way, the remote operation from the Ethernet node to the HDLC node and the protocol converter can be performed. Since the construction is employed which a response to the control instructed from the Ethernet node is sent out, it is also possible to the Ethernet node to recognize the states in execution of control.

Figure 25:
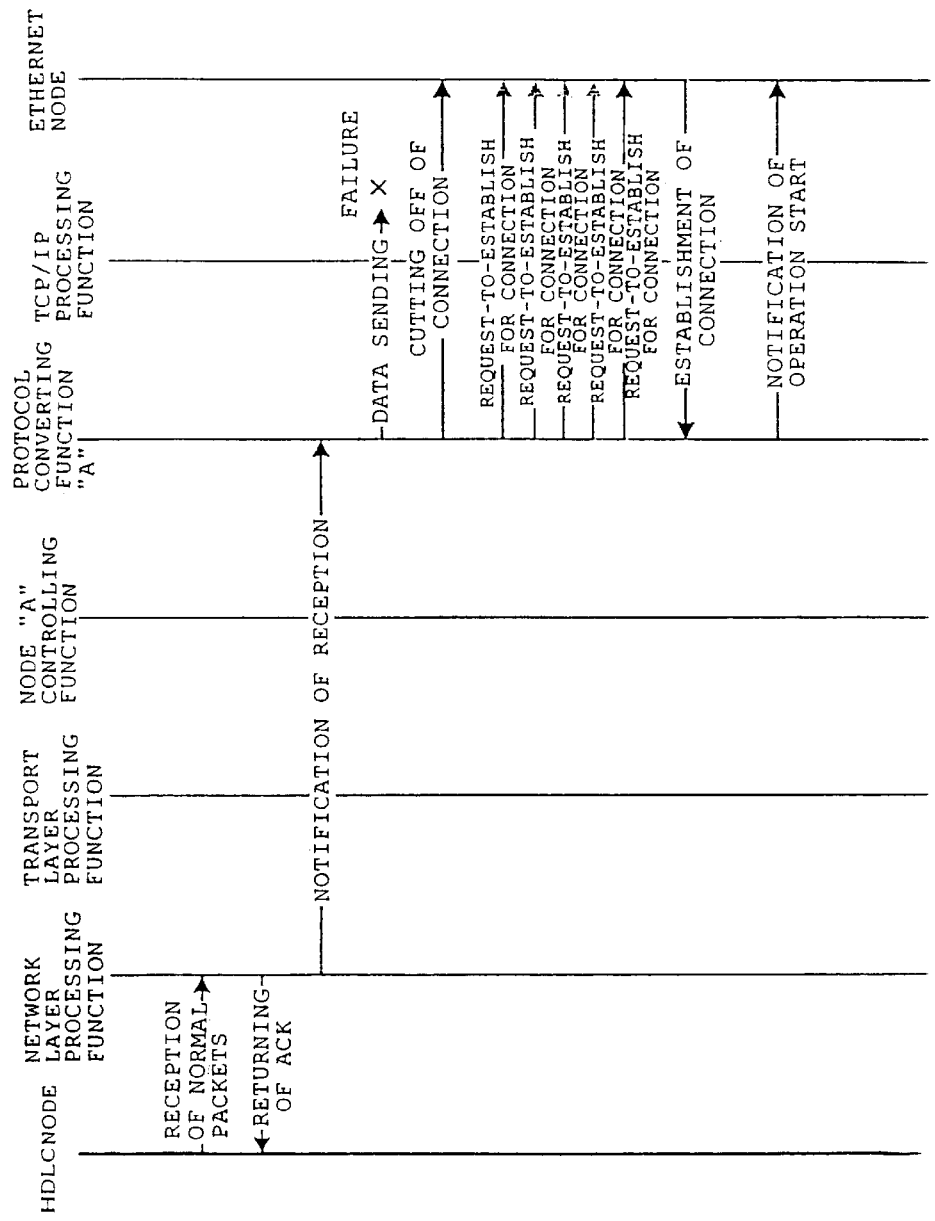
FIG. 25 is a sending and receiving sequence in an abnormal state when being communicated from the HDLC node to the Ethernet node.

FIG. 25 is a transmission and reception sequence in the case that data transmission from the HDLC node to the Ethernet node ends in "abnormal states".

Specifically, the network layer processing function receives normal packets from the HDLC node. This function then returns an ACK to the HDLC node. This function also notifies the protocol converting function "A" of the data reception through the transport layer processing function.

Although the protocol converting function "A" sent communication data to the Ethernet node through the TCP/IP processing function, assume that the transmission resulted in failure. In this case, the connection established with the Ethernet node is cut off by the protocol converting function "A".

The protocol converting function "A" sends to the Ethernet node a request-to-establish for connection through the TCP/IP processing function. This request is continued until the connection with the Ethernet node is established.

On one hand, the Ethernet node notifies the protocol converting function "A" of the establishment of the connection through the TCP/IP processing function. Responsively, the function "A" confirms the establishment, before notifying the Ethernet node of the operation start through the TCP/IP processing function.

As seen from the above, in the case that abnormalities was detected in the Ethernet node side, the connection with the Ethernet node is temporarily cut off. At the next stage, an operation for reconnection with the Ethernet node is started, and the connection establishment is confirmed. After this confirmation, a message notifying the operation start is sent to the Ethernet node.

The foregoing procedures enables the Ethernet node to recognize not only the occurrence of abnormalities in itself but also that there is a possibility that data are dropped from the communication data sent by the HDLC node.

Figure 26:
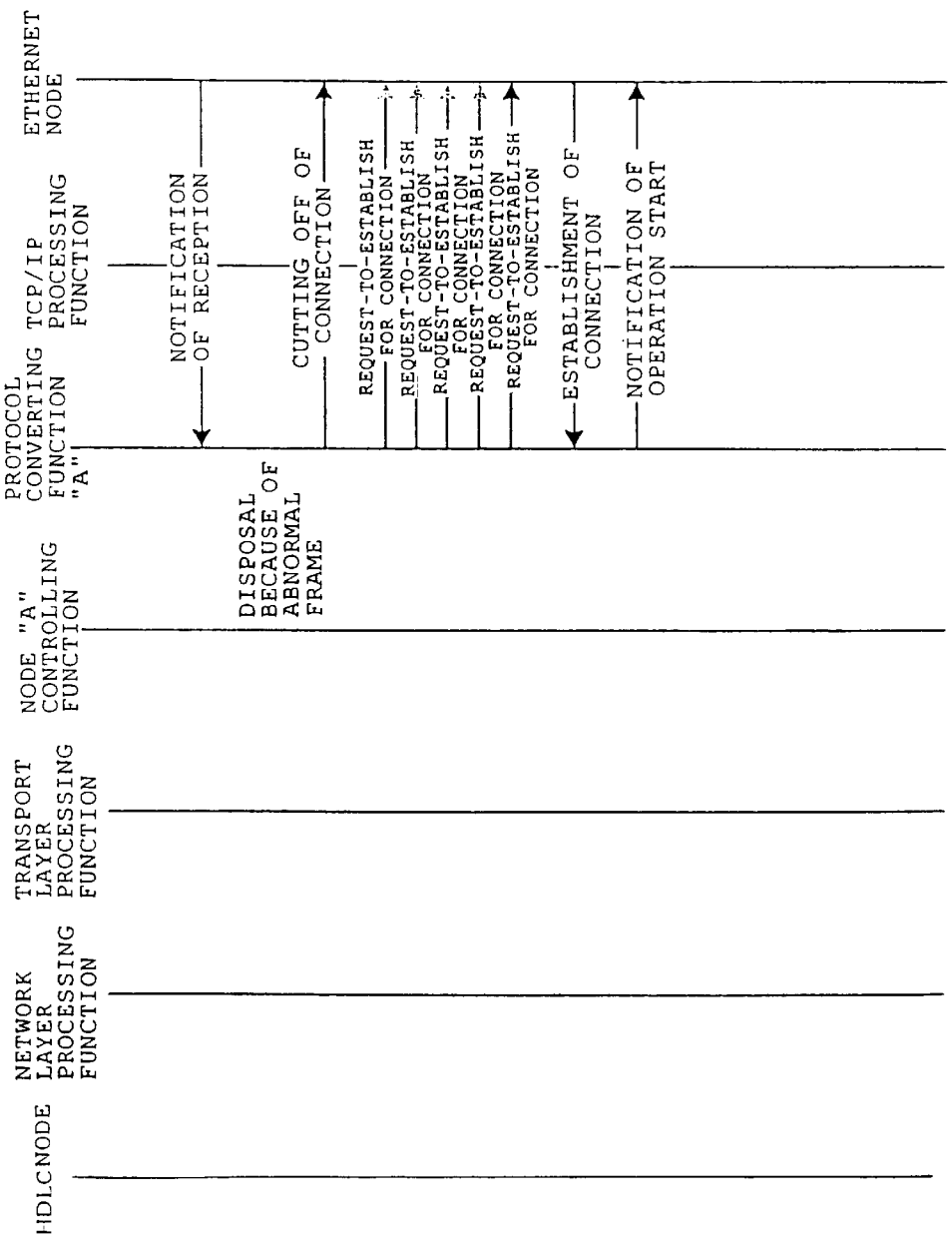
FIG. 26 is a sending and receiving sequence in an abnormal state of the Ethernet node when being sent from the Ethernet node to the HDLC node.

FIG. 26 is a transmission and reception sequence in the case that data transmission from the Ethernet node to the HDLC node ends in "abnormal states".

To be specific, the protocol converting function "A" receives, through the TCP/IP processing function, abnormal frames from the Ethernet node, and disposes of the abnormal frames.

Then the protocol converting function "A" cuts off the connection which has been established with the Ethernet node. After this, the function "A" sends a request-to-establish for connection to the Ethernet node through the TCP/IP processing function. This request is continued until the connection is established.

On one hand, the Ethernet node notifies the protocol converting function "A" of the connection establishment through the TCP/IP processing means. In response to this, the protocol converting function "A" confirms the connection establishment. After the confirmation has been made, the function "A" notifies the Ethernet node of the operation start through the TCP/IP processing function.

Accordingly, when abnormal frames are detected from the Ethernet node side, the connection with the Ethernet node is temporarily cut off. Then a reconnection operation is started, and if the connection establishment has been confirmed, the start of operation is notified to the Ethernet node.

The forgoing procedures permits the Ethernet node to recognize the occurrence of abnormalities in itself. Further the failure of the upper layers of the Ethernet node makes it possible to know that data were unsuccessful in communication in the normal state.

As shown in FIGS. 25 an 26, in the case that abnormalities associated with the Ethernet node are detected, the connection is temporarily cut off. A reconnection is then requested again until it is established. After this establishment, a notification of the operation start is done to the Ethernet node. According to such manner makes it easier a recovery operation from the abnormal states.

A method of converting protocols will now be explained. FIG. 2 represents a flow of procedures in converting protocols along a direction from the node "A" (hereinafter, referred to as HDLC node") to the node "B" (hereinafter, referred to as "Ethernet node").

Specifically, communication data sent from the HDLC node are processed in the lower layers of the HDLC protocol. This "processing" executed herein means a conversion of the frames converted from FR1 to FR2 in foregoing FIG. 10.

Information added which is dedicated for a conversion to the Ethernet protocol based on communication data sent from the HDLC node. The information-added communication data are then processed in the lower layers of the Ethernet protocol to send them to the Ethernet node. The "processing" executed herein corresponds to a series of conversion procedures from FR3 to TCP1, to IP1, and to Et1 shown in foregoing FIG. 10.

The communication data are processed in the lower layers of the Ethernet protocol. The "processing" executed herein means the opposite operation to the above, that is, a series of conversion procedures from Et1 to IP1, to TCP1, and to FR3. The added information is terminated. And the communication data are sent to the upper layers of the Ethernet protocol.

FIG. 3 shows a flow of procedures in converting protocols along a direction from the Ethernet node to the HDLC node.

According to this flow, communication data are processed in the upper layers of the Ethernet protocol. The "processing" executed herein includes the processing of communication data in the application layer. Information is added to the communication data so as to be recognized by the HDLC protocol.

The information-added communication data are processed by the lower layers of the Ethernet protocol and sent. The "processing" executed herein means a series of conversion steps of FR3 to TCP1, to IP1, and to Et1 shown in FIG. 10. The communication data are processed by the lower layers of the Ethernet protocol. The processing executed herein means a series of conversion steps of FR3 to TCP1, to IP1, and to Et1, as shown in FIG. 10.

The added information is terminated and the communication data are converted to frames which can be recognized by the HDLC node. The frames are then processed in the lower layers of the HDLC node to form communication data sent to the HDLC node. The "processing" executed herein means a conversion of the frames converted from FR2 to FR1 in FIG. 10.

Though the HDLC protocol is used as the protocol of the node "A" in the forgoing construction, other types of protocols, such as lower-layer connectionless-directed protocols, may also be used. Also the Ethernet LAN protocol is used as the protocol of the node "B", other types of protocols, such as lower-layer connection-directed protocols, may also be used.

Next, a method of controlling the HDLC node from the Ethernet node will now be described. FIG. 4 is a flowchart showing procedures for the control method.

Specifically, communication data are processed in the upper layers of the Ethernet protocol. The "processing" used herein includes processing of communication data in the application layer. In order that the HDLC node is able to control it and the node "A" controlling part is able to recognize it, control information is added to the communication data.

Figure 11:
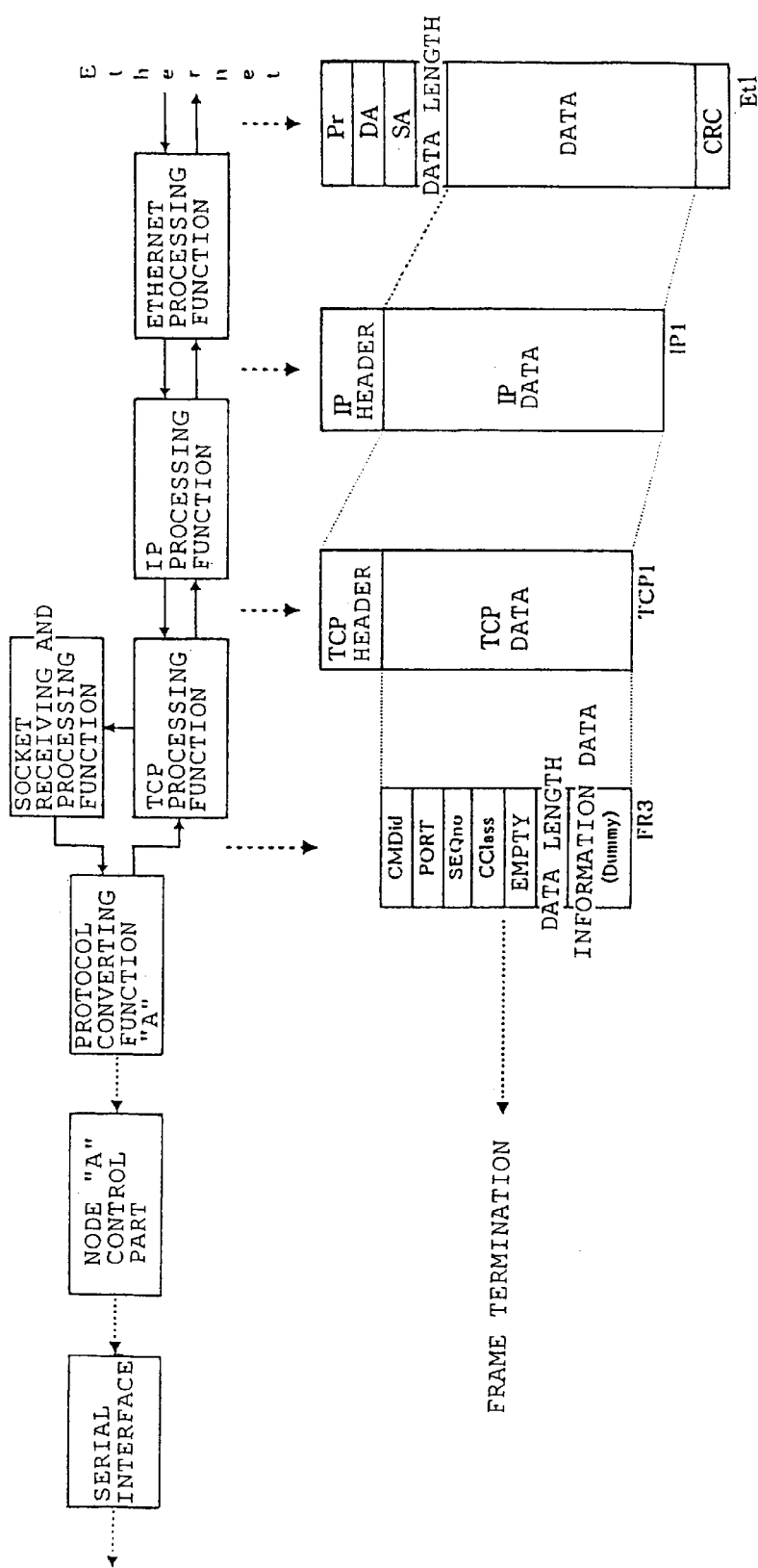
FIG. 11 pictorially shows frame conversions executed in the protocol converter when controlling an HDLC node from an Ethernet node.

The information-added communication data are processed in the lower layers of the Ethernet protocol, before they are sent. The processing executed herein corresponds to a series of frame conversions of FR3 to TCP1, to IP1, and to Et1. The communication data are processed in the in the lower layers of the Ethernet protocol. The "processing" executed herein corresponds to a series of frame conversions of FR3 to TCP1, to IP1, and to Et1, as shown in FIG. 11. The added control information is terminated and instructions are sent to the serial interface to control the HDLC node.

On the basis of the control instructions, control to the HDLC node is performed with the serial interface function.

A method of notifying the Ethernet node of the states of the HDLC node will now be explained. FIG. 5 shows a flowchart of procedures necessary for the notification.

Referring to the procedures, the node "A" controlling part uses the serial interface to produce frames (the states of the node "A"). Added to the frames thus-produced is information for conversion to the Ethernet protocol, thereby forming communication data.

The communication data are then processed in the lower layers of the Ethernet protocol, and sent to the Ethernet node. The "processing" executed herein is a series of frame conversions of FR3 to TCP1, to IP1, and to Et1, as shown in FIG. 11.

Also the communication data are processed in the lower layers of the Ethernet protocol. The "processing" executed herein is the opposite to the above, which is frame conversions of Et1 to IP1, to TCP1, and to FR3. The added information is terminated.

The communication data is sent to the upper layers of the Ethernet protocol.

As described so far, the protocol conversion system is capable of converting protocols between the upper layers and the lower layers, thereby securing a higher reliability in data communication. In addition, a construction in which the termination is not performed up to the upper layers enables a flexible protocol conversion. Furthermore, since the upper layers of the Ethernet protocol integratedly performs system management operations, such as the remote control of the HDLC node and the instructions for the system operation start, flexibility can be provided to the system configuration.

A variety of modifications and variations for the invention will be apparent to those skilled in the art in view of the foregoing description. Thus, it is to be understood that, within the scope of the appended claims, the invention may be practiced other than as specifically described hereinabove.

What we claim is:

1. A protocol conversion system intervening, between a first open type communication network system conforming a first protocol and a second open type communication network system conforming a first protocol and being responsible for sending and receiving communication data therebetween, comprising:

header adding means for adding to the communication data a header having protocol converting information; and information including means for including information about success and failure in communication into the header.

2. The protocol conversion system of claim 1, further comprising interface means for reading a communication state of one of the first and second communication network systems from the other of the first and second communication network systems.

3. The protocol conversion system of claim 1, further comprising a network having an OSI reference model, and means for performing one of processing and termination in a transport layer and a layer lower than the transport layer.

4. A protocol conversion system intervening between different types of networks and being responsible for sending and receiving communication data therebetween, comprising:

a first node performing communication of data based on a first protocol defining a communication system of a first network;

a second node performing communication of data based on a second protocol defining a communication system of a second network, said second node including a protocol converting means for adding conversion information for conversion to the first protocol, adding control information for control of the first node, and terminating conversion information, for conversion to the second protocol; and a protocol converter for mutually relaying the communication data between the first and second nodes and for controlling the first node, comprising:

first communication data processing means for processing the communication data to the first node layer by layer;

second communication data processing means for processing the communication data to the second node layer by layer;

node control means not only having serial interface means but also having means for controlling the first node using the serial interface means, monitoring a state of the first node, and notifying the second node of a monitored state of the first node; and further protocol converting means for terminating the conversion information for conversion to the first protocol, converting to frames recognized by the first node based on the terminated conversion information, terminating the control information for control of the first node, and adding the conversion information for conversion of the communication data from the first node into the second protocol.

5. The protocol conversion system of claim 4, wherein each of said first and second communication data processing means is constructed to terminate only lower layers of a protocol implemented in each processing means.

6. The protocol conversion system of claim 4, wherein said first protocol is an HDLC.

7. The protocol conversion system of claim 4, wherein said second protocol is a TCP/IP.

8. The protocol conversion system of claim 4, wherein said further protocol converting means includes means for replacing a header composed of a first identifier for identifying a type of the communication data, a second identifier indicating an origin from which the communication data are sent, a third identifier indicating a destination to which the communication data are sent, a fourth identifier indicating sequential information, and a fifth identifier indicating details of the first identifier.

9. The protocol conversion system of claim 8, wherein said further protocol converting means includes means for classifying the communication data by identifying the header.

10. The protocol conversion system of claim 4, wherein said node control means includes mean for monitoring the state of the first node through the serial interface means, and means for notifying the second node of the state of the first node when the monitoring means detects changes in the state of the first node.

11. The protocol conversion system of claim 10, wherein said node control means further includes means for storing information about the monitored state of the first node, and said notifying means is constructed to notify the second node of the state of the first node in response to a request originated from the first node.

12. The protocol conversion system of claim 4, wherein said first node has means for receiving a physical address sent by the serial interface means and setting the physical address in the first protocol.

13. The protocol conversion system of claim 12, wherein said receiving and setting means is constructed to be performed responsively to a request-to-start of operation sent from the second node.

14. The protocol conversion system of claim 4, wherein said protocol converter further comprises means for determining an abnormal state of a connection with the second node, means for cutting off the connection if the abnormal state is determined, means for performing a reconnection operation with the second node, and means for notifying the first node of the reconnection when the reconnection has been achieved.

* * * * *